US008923700B2

(12) United States Patent
Socci et al.

(10) Patent No.: US 8,923,700 B2
(45) Date of Patent: Dec. 30, 2014

(54) METHOD AND SYSTEM FOR TUNABLE OPTICAL FILTERING

(75) Inventors: Luciano Socci, Milan (IT); Paola Galli, Milan (IT); Silvia Ghidini, Milan (IT); Marco Romagnoli, Milan (IT)

(73) Assignee: Google Inc., Mountain View, CA (US)

( * ) Notice: Subject to any disclaimer, the term of this patent is extended or adjusted under 35 U.S.C. 154(b) by 1653 days.

(21) Appl. No.: 12/087,064

(22) PCT Filed: Dec. 28, 2005

(86) PCT No.: PCT/EP2005/014093
§ 371 (c)(1),
(2), (4) Date: Oct. 27, 2008

(87) PCT Pub. No.: WO2007/073764
PCT Pub. Date: Jul. 5, 2007

(65) Prior Publication Data
US 2009/0273842 A1      Nov. 5, 2009

(51) Int. Cl.
*H04J 14/02* (2006.01)
*G02B 6/12* (2006.01)
*G02B 6/293* (2006.01)

(52) U.S. Cl.
CPC ......... *G02B 6/12007* (2013.01); *H04J 14/0204* (2013.01); *H04J 14/0205* (2013.01); *H04J 14/0206* (2013.01); *H04J 14/021* (2013.01); *G02B 6/29343* (2013.01); *G02B 6/29353* (2013.01); *H04J 14/0208* (2013.01); *H04J 14/0212* (2013.01)
USPC ............................................................ 398/85

(58) Field of Classification Search
CPC .............. H04J 14/0204; H04J 14/0205; H04J 14/0206; H04J 14/0208; H04J 14/021; H04J 14/0212

USPC ............................................................ 398/85
See application file for complete search history.

(56) References Cited

U.S. PATENT DOCUMENTS 6,832,027 B2 * 12/2004 Wada et al. .................. 385/37
6,839,482 B2   1/2005 Margalit
(Continued)

FOREIGN PATENT DOCUMENTS

EP     1 176 438 A1    1/2002
EP     1 426 800 B1    6/2004
(Continued)

OTHER PUBLICATIONS

B. Little et al., "Microring Resonator Channel Dropping Filters", Journal of Lightwave Technology, vol. 15, No. 6, Jun. 1997.*
(Continued)

*Primary Examiner* — Shi K Li
(74) *Attorney, Agent, or Firm* — Honigman Miller Schwartz and Cohn LLP

(57) ABSTRACT

An optical device includes an optical splitter having an input port, a first output port and a second output port and is adapted to receive at said input port a WDM optical signal including a plurality of channels equally spaced by a frequency spacing and occupying an optical bandwidth, and wherein the optical splitter is adapted to output at the first and second output ports, respectively, a first and a second portion of the optical signal; an optical combiner having a respective first and second input ports and a respective output port; a first optical path optically connecting the first output port of the optical splitter to the first input port of the optical combiner; a second optical path optically connecting the second output port of the optical splitter to the second input port of the optical combiner, a first optical filter optically coupled along the first optical path, and a second optical filter optically coupled to the second optical path and the free spectral range of both the first and the second optical filter is equal to an odd multiple of the frequency spacing and greater than half of the optical bandwidth.

24 Claims, 16 Drawing Sheets

(56) References Cited

U.S. PATENT DOCUMENTS

| | | | |
|---|---|---|---|
| 7,120,333 B2 * | 10/2006 | Eder et al. ................... 385/27 |
| 2002/0126291 A1 | 9/2002 | Qian et al. |
| 2004/0136647 A1 | 7/2004 | Mizuno et al. |
| 2005/0265720 A1 | 12/2005 | Ling et al. |
| 2005/0271323 A1 | 12/2005 | Zhang et al. |
| 2005/0275921 A1 | 12/2005 | Haus et al. |
| 2007/0140700 A1 * | 6/2007 | Vassilieva et al. ............ 398/147 |
| 2009/0220228 A1 * | 9/2009 | Popovic ........................ 398/48 |

FOREIGN PATENT DOCUMENTS

| WO | WO 03/052475 A1 | 6/2003 |
|---|---|---|
| WO | WO 2005/024481 A1 | 3/2005 |
| WO | WO 2005/064375 A1 | 7/2005 |
| WO | WO 2005/083486 A1 | 9/2005 |
| WO | WO 2005/121854 A1 | 12/2005 |
| WO | WO 2007/073763 A1 | 7/2007 |
| WO | WO 2007/074485 A1 | 7/2007 |

OTHER PUBLICATIONS

Habara, T. et al., "Frequency Multiplex Type Optical Switch and Frequency Multiplex Type Optical Switch Matrix," Patent Abstracts of Japan, JP. No. 05-323390, published Dec. 7, 1993, 1 Sheet.

Socci, L. et al., "Method and Device for Tunable Optical Filtering," U.S. Appl. No. 12/087,063, filed Jun. 25, 2008.

Socci, L. et al., "Method and Device for Tunable Optical Filtering," U.S. Appl. No. 12/087,016, filed Jun. 24, 2008.

* cited by examiner

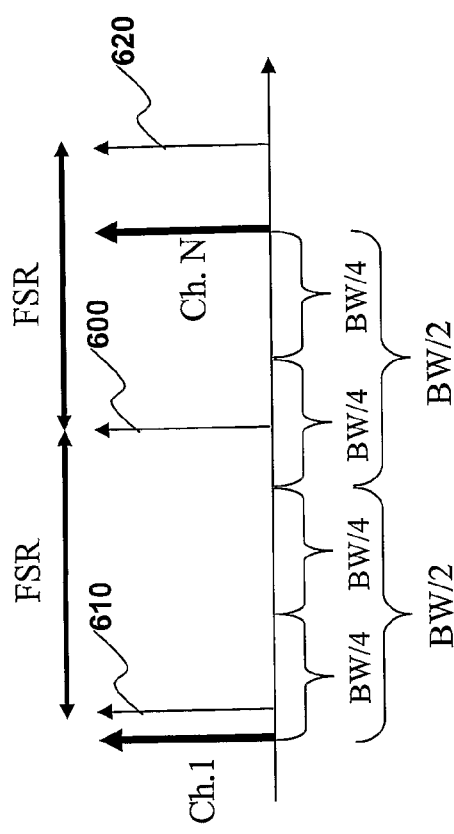
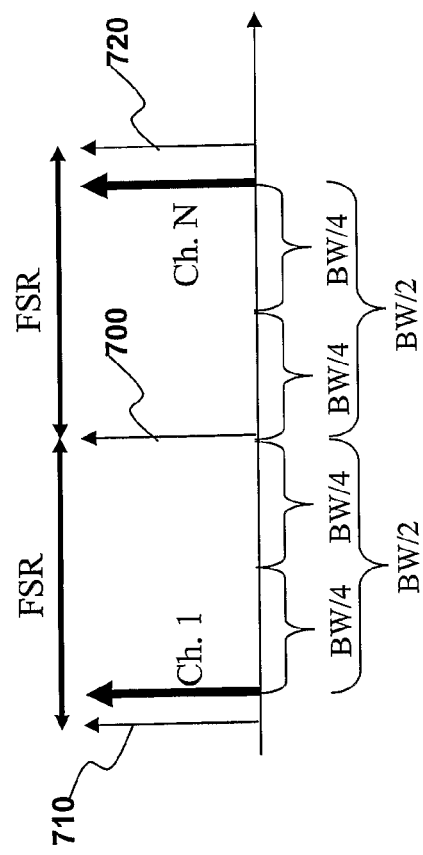

METHOD AND SYSTEM FOR TUNABLE OPTICAL FILTERING

CROSS REFERENCE TO RELATED APPLICATION

This application is a national phase application based on PCT/EP2005/014093, filed Dec. 28, 2005, the content of which is incorporated herein by reference.

FIELD OF THE INVENTION

The present invention relates to the field of optical communication systems including tunable optical filtering functionality, such as tunable optical add and/or drop functionality.

BACKGROUND OF THE INVENTION

A common technique to increase the transmission capacity of today optical communication systems is wavelength division multiplexing (WDM), wherein a plurality of optical channels, each having a respective optical frequency (and correspondingly respective optical wavelength), are multiplexed together in a single optical medium, such as for example an optical fiber. The optical frequencies allocated for the WDM channels are typically arranged in a grid having an equal spacing between two adjacent frequencies. In dense WDM (DWDM), wherein the WDM channels may be closely spaced, the frequency spacing is typically equal to about 100 GHz (corresponding wavelength spacing of about 0.8 mm) or about 50 GHz (about 0.4 mm). Other used channel separations are 200 GHz, 33.3 GHz and 25 GHz. Typically, the set of allocated optical frequencies occupies an optical bandwidth of about 4 THz, which gives room for the use of up to 40 or 41 WDM channels having 100 GHz spacing. The device of the present invention is suitable for a WDM optical bandwidth of at least about 1 THz, preferably at least about 2 THz, typically placed around 1550 mm.

Optical networking is expected to be widely used in perspective optical communication field. The term 'optical network' is commonly referred to an optical system including a plurality of point-to-point or point-to-multipoint (e.g., metro-ring) optical systems optically interconnected through nodes. In all-optical transparent networks few or no conversions of the optical signal into electrical signal, and then again in optical signal, occur along the whole path from a departure location to a destination location. This is accomplished by placing at the nodes of the optical networks electro-optical or optical devices which are apt to process the optical signal in the optical domain, with limited or no need for electrical conversion. Examples of such devices are optical add and/or drop multiplexers (OADM), branching units, optical routers, optical switches, optical regenerators (re-shapers and/or re-timers) and the like. Accordingly, the term 'optical filtering' or 'optical processing', for the purpose of the present description is used to indicate any optical transformation given to an optical radiation, such as extracting a channel or a power portion of said channel from a set of WDM channels ('dropping'), inserting a charnel or a power portion of said channel into a WDM signal ('adding'), routing or switching a channel or its power portion on a dynamically selectable optical route, optical signal reshaping, retiming or a combination thereof. In addition, optical systems, and at a greater extent optical networks, make use of optical amplifiers in order to compensate the power losses due to fiber attenuation or to insertion losses of the optical devices along the path, avoiding the use of any conversion of the optical signal into the electrical domain even for long traveling distances and/or many optical devices along the path. In case of DWDM wavelengths, all channels are typically optically amplified together, e.g. within a bandwidth of about 32 nm around 1550 mm.

In optical systems, and at a greater extent in optical networks, a problem exists of filtering one or more optical channels at the nodes while minimizing the loss and/or the distortion of the filtered optical channel(s), as well the loss and/or the distortion of the optical channels transmitted through the node ideally without being processed (hereinafter referred to as 'thru' channels). Advantageously, the optical processing node should be able to simultaneously process more than one channel, each one arbitrarily selectable independently from the other processed channels. Ideally up to all the channels may be simultaneously selectable to be processed, but in practice a number between 2 and 16, preferably between 4 and 8, is considered to be sufficient for the purpose.

It is desirable that the optical processing node is tunable or reconfigurable, i.e., it can change dynamically the subset of channels on which it operates. In order to be suitable to arbitrarily select the channel to be processed within the whole WDM optical bandwidth, the tuning range of the whole optical processing node should be at least equal to said optical bandwidth. It is in general a problem to tune an optical filter over the whole optical bandwidth, especially when the bandwidth exceeds about 3 THz, for example when it is equal to about 4 THz. For example, notwithstanding the silicon's fairly large thermo-optic effect, scanning the entire telecommunication C-band (32 nm or 4 THz) with a single tunable silicon filter, such as a single silicon microring filter, remains quite a difficult task due to the high temperatures reached at the heater layer (up to about 600° C.).

It is also preferred that while the processing node "moves" from an initial channel (A) to a destination channel (B), the channels different from A and B remain unaffected by the tuning operation. In this case the component is defined as 'hitless'. In particular, the channels placed between the initially processed channel and the final channel after tuning should not be subject to an additional impairment penalty, called 'hit', by the tuning operation. The hit may include a loss penalty and/or an optical distortion such as phase distortion and/or chromatic dispersion.

For example, optical communication networks need provisions for partially altering the traffic at each node by adding and/or dropping one or several independent channels out of the total number. Typically, an OADM node removes from a WDM signal a subset of the transmitted channels (each corresponding to one frequency/wavelength), and adds the same subset with a new information content, said subset being dynamically selectable.

There are several additional concerns. The tunable optical processing node should not act as a narrow band filter for the unprocessed channels, since concatenation of such nodes would excessively narrow the channel pass bands. The tunable optical processing node should also be ultra-compact and should have low transmission loss and low cost, since these important factors ultimately determine which technology is selected.

U.S. Pat. No. 6,839,482 discloses (see, e.g., FIG. 2 thereof) an optical filter device for processing a multi-frequency light signal to separate therefrom a predetermined frequency component, the device comprising: (i) a first tunable filter structure having a first tuning range and operable to receive an input light signal and output first and second light components thereof through first and second spatially separated light paths, respectively, the first light component having a specific frequency range of the input signal including said predetermined frequency component, and the second light component including a remaining portion of the input light; and (ii) a second tunable filter structure having a second tuning range defining an optical spectrum overlapping with that of the first filter, the second filter being operable to receive the first light component and separate therefrom said predetermined frequency component to propagate to a drop/add light path of the device and direct a remaining portion of the first light component into the first filter structure to be output at the second light path.

SUMMARY OF THE INVENTION

The Applicant has noted that the filter device described in the cited U.S. Pat. No. 6,839,482 is not optimally designed for adding and/or dropping a plurality of independent optical channels. Considering, by way of example, the need of adding and/or dropping two independent channels from a WDM signal, in the cited patent it is suggested to cascade two times the whole structure (e.g. that of FIG. 2, bottom, thereof), thus giving rise to several disadvantages. The resulting structure would be complex, both in structure and in operation. Moreover, the cascade of two first tunable filter structures (e.g. ring-resonator pairs R1-R2 and R3-R4 of FIG. 2 of the cited patent) gives rise to a corresponding duplication of the attenuation and the chromatic dispersion introduced by the single first tunable filter structure on the thru channels. The above problems worsen with the increasing of the number of independent channels to be added and/or dropped.

The Applicant has found that there is a need for an optical communication system having tunable optical processing functionality which leaves unaltered, or at least reduces the alteration of, the thru channels during processing operation. Moreover, the optical processing node should preferably leave unaltered the thru channels during tuning, i.e. it should be hitless. In particular, it is desired that the optical processing node introduces no or low chromatic dispersion to the thru channels. In addition, the optical processing node should preferably be low-loss, low-cost, fast tunable and/or broadband.

The Applicant has found a method and a system for optical transmission provided with tunable optical processing functionality which can solve one or more of the problems stated above. The solution of the present invention is simple, feasible and low cost.

The optical device comprises an optical splitter having an input port, a first output port and a second output port and being adapted to receive at said input port an optical signal comprising a plurality of channels lying on a grid of optical frequencies equally spaced by a frequency spacing and occupying an optical bandwidth, and wherein said optical splitter is adapted to output at said first and second output port respectively a first and a second portion of said optical signal; an optical combiner having a respective first and second input port and a respective output port and being adapted to combine two optical radiations, input respectively into the first and second input port, and to output them into the respective output port; a first optical path optically connecting the first output port of the optical splitter to the first input port of the optical combiner and apt to propagate said first portion; a second optical path optically connecting the second output port of the optical splitter to the second input port of the optical combiner and apt to propagate said second portion; a first optical filter optically coupled along the first optical path and apt to filter a channel within said first portion propagating through the first optical path; and a second optical filter optically coupled to the second optical path and apt to filter a channel within said second portion propagating through the second optical path; wherein said first portion substantially comprises the channels which lie on a sub-grid of optical frequencies equally spaced by the double of said frequency spacing and the second portion substantially comprises the remaining channels, and the free spectral range of both the first and the second optical filter is substantially equal to an odd multiple of said frequency spacing and greater than half of said optical bandwidth.

The particular architecture enables a full C-band (32 nm) selectivity by effectively tuning the single drop filter only about half of it (18.4 nm). An advantage of the present solution is that both the optical splitter and the optical combiner do not need to be tuned while having the capability of filtering an arbitrary optical channel in the WDM bandwidth. A trimming heater will be in any case fabricated on top of each interleaver to carefully align their frequencies to the ITU grid and to compensate for possible fabrication errors.

According to another aspect of the present invention, an optical communication system comprises a transmitter, a receiver, an optical line optically connecting the transmitter and the receiver and an optical device according to the above and coupled along the optical line.

According to a further aspect of the present invention, there is provided a method for filtering an optical signal comprising a plurality of channels lying on the grid of optical frequencies equally spaced by a given frequency spacing and occupying an optical bandwidth, comprising:

a) splitting said optical signal into a first and a second portion spatially separated, wherein the first portion substantially comprises the channels lying on a first sub-grid of optical frequencies spaced by the double of said frequency spacing and the second portion substantially comprises the remaining channels lying on a second sub-grid, b) filtering a channel belonging to the first portion by way of a first optical filter (250) adapted to act solely on the first portion and configured so that one of its resonances overlaps the optical frequency of said channel, one of the two adjacent resonances overlaps an optical frequency of the second sub-grid and the other adjacent resonance lies outside said optical bandwidth;

c) performing at least one of the two following steps:
 c1) making the second portion bypass a second optical filter (260) adapted to act solely on the second portion; and
 c2) configuring said second optical filter (260) so that one of its resonances overlaps an optical frequency of the first sub-grid near the center of said optical bandwidth and the two respective adjacent resonances both lie outside said optical bandwidth; and d) recombining said first and second filtered portions.

In advantageous embodiments of the method of the present invention, the distance between said one resonance of said second optical filter (260) and each one of said two adjacent resonances may exceed half of optical bandwidth by more than said frequency spacing, the distance between said one resonance of said first optical filter (250) and each one of said two adjacent resonances may exceed half of optical bandwidth, the distance between said one resonance of said second optical filter (260) overlapping said optical frequency of the first sub-grid near the center of said optical bandwidth may be distinct from the optical frequency of the filtered channel, or each of the first (250) and second (260) optical filters may be an add and/or drop filter adapted to drop or add an optical channel comprised respectively within the first and the second portion.

Accordingly to a still further aspect of the present invention, a method for changing the filtering of an optical signal comprises a plurality of channels lying on a grid of optical frequencies equally spaced by a given frequency spacing and occupying an optical bandwidth, comprising:

a) configuring an optical splitter (210) so as to split said optical signal into a first and a second portion directed respectively to a first and a second optical path (230, 240), wherein the first portion substantially comprises the channels lying on a first sub-grid of optical frequencies spaced by the double of said frequency spacing and the second portion substantially comprises the remaining channels lying on a second sub-grid, b) filtering an initial channel belonging to the first portion by way of a first optical filter (250) optically coupled along the first optical path and configured so that one of its resonances overlaps the optical frequency of said initial channel, one of the two adjacent resonances overlaps an optical frequency of the second sub-grid and the other adjacent resonance lies outside said optical bandwidth;

c) configuring an optical combiner (220) so as to recombine said first and second filtered portions, the method further comprising the steps of:

d) performing at least one of the following two steps:
  d1) making the first portion to bypass said first optical filter (250); and
  d2) tuning said first optical filter (250) so that one of its resonances overlaps an optical frequency of the second sub-grid near the center of said optical bandwidth and the two respective adjacent resonances both lie outside said optical bandwidth;

e) tuning a second optical filter (260) optically coupled along the second optical path so that one of its resonances overlaps the optical frequency of a final channel belonging to the second portion, a respective adjacent resonance overlaps an optical frequency of the first sub-grid and the other adjacent resonance lies outside said optical bandwidth; and f) filtering said final channel by way of the second optical filter (260).

An advantageous embodiment of this method further comprises, before steps d), e) and f):

g) performing at least one of the following two steps:
  g1) making the second portion bypass said second optical filter (260); and
  g2) tuning said second optical filter (260) so that one of its resonances overlaps an optical frequency of the first sub-grid near the center of said optical bandwidth and the two respective adjacent resonances both lie outside said optical bandwidth.

According to a still further aspect of the present invention, there is provided a method for changing the filtering of an optical signal comprising a plurality of channels lying on a grid of optical frequencies equally spaced by a given frequency spacing and occupying an optical bandwidth, comprising:

a) tuning an optical splitter (210) so as to split said optical signal into a first and a second portion directed respectively to a first and a second optical path (230, 240), wherein the first portion substantially comprises the channels lying on a first sub-grid of optical frequencies spaced by the double of said frequency spacing and the second portion substantially comprises the remaining channels lying on a second sub-grid, b) filtering an initial channel belonging to the first portion by way of a first optical filter (250) optically coupled along the first optical path and configured so that one of its resonances overlaps the optical frequency of said initial channel, one of the two adjacent resonances overlaps an optical frequency of the second sub-grid and the other adjacent resonance lies outside said optical bandwidth; and c) tuning an optical combiner (220) so as to recombine said filtered first and second portions, the method further comprising the steps of d) tuning said optical splitter (210) so that it splits said optical signal into said first and second portion directed respectively to said second and first optical paths;

e) performing at least one of the following two steps:
  e1) making the second portion to bypass said first optical filter (250); and
  e2) tuning said first optical filter (250) so that one of its resonances overlaps an optical frequency of the first sub-grid near the center of said optical bandwidth and the two respective adjacent resonances both lie outside said optical bandwidth;

f) tuning a second optical filter (260) optically coupled along the second optical path so that one of its resonances overlaps the optical frequency of a final channel belonging to the first portion, a respective adjacent resonance overlaps an optical frequency of the second sub-grid and the other adjacent resonance lies outside said optical bandwidth;

g) filtering said final channel by way of the second optical filter (260); and h) tuning said optical combiner (220) so that it recombines said filtered first and second portions.

In an advantageous embodiment, the method of the present invention further comprises, before d), e), f), g) and h):

i) performing at least one of the following two steps:)
  i1) making the second portion bypass said second optical filter (260); and
  i2) tuning said second optical filter (260) so that one of its resonances overlaps an optical frequency of the first sub-grid near the center of said optical bandwidth and the two respective adjacent resonances both lie outside said optical bandwidth.

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein:

FIGS. 3A and 3B are schematic diagrams exemplary showing the operation of the device according to the present invention;

DETAILED DESCRIPTION OF THE PREFERRED EMBODIMENT(S) OF THE INVENTION

Figure 1:
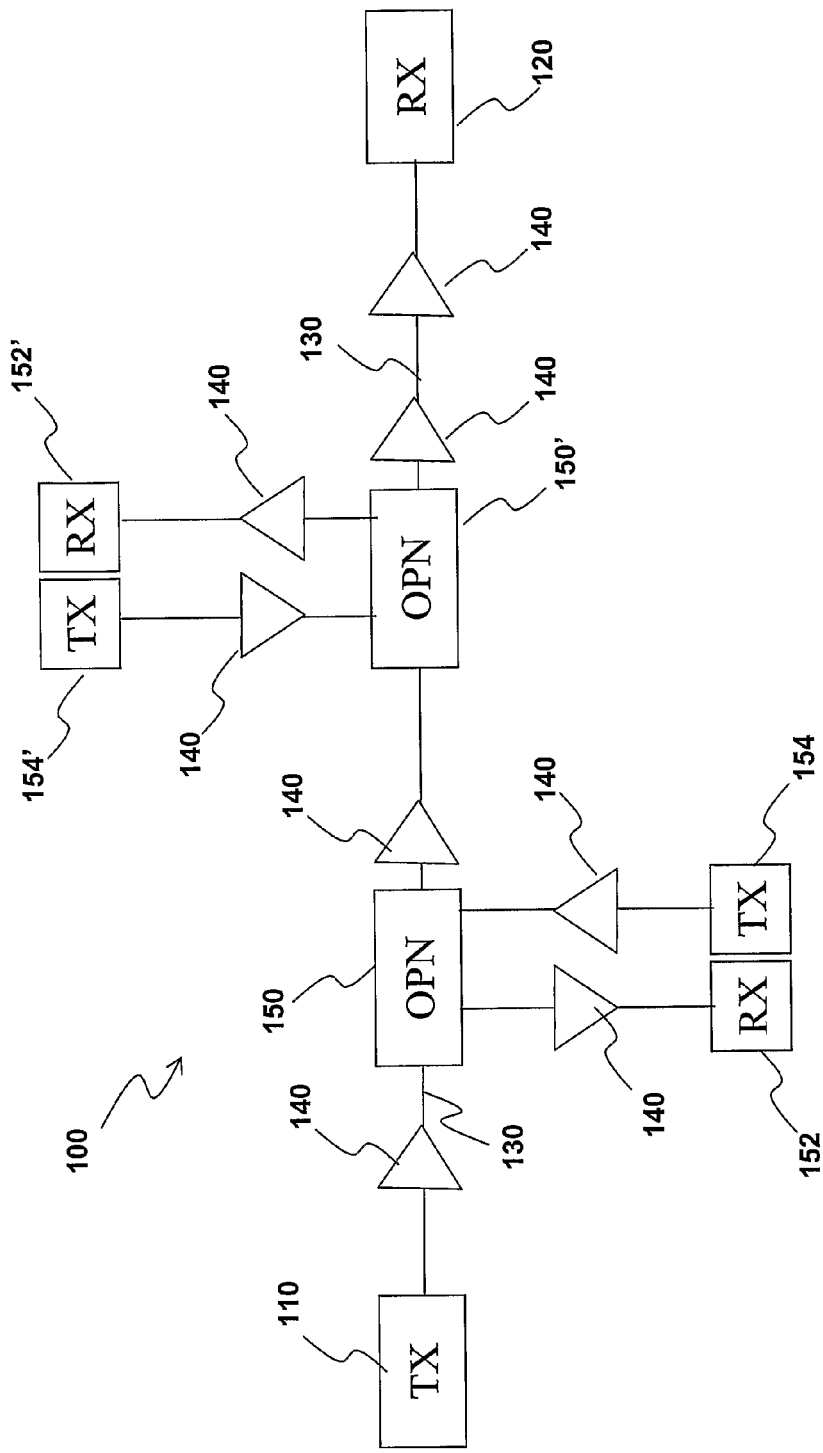
FIG. 1 schematically shows in terms of functional blocks an exemplary optical communication system architecture according to the present invention.

FIG. 1 shows an optical communication system architecture according to a possible embodiment of the present invention.

The optical communication system 100 comprises at least a transmitter 110, a receiver 120 and an optical line 130 which optically connects the transmitter and the receiver. The transmitter 110 is an opto-electronic device apt to emit an optical signal carrying information. It typically comprises at least an optical source (e.g., a laser) apt to emit an optical radiation and at least a modulator apt to encode information onto the optical radiation. Preferably, the transmitter 110 is a WDM transmitter (e.g., a DWDM transmitter) and the optical signal may comprise a plurality of optical channels (each carrying modulation-encoded information) having respective optical frequencies equally spaced by a given frequency spacing and occupying an optical bandwidth. Preferably, said optical bandwidth is at least 2 THz (in the near-infrared wavelength range, e.g. from 900 nm to 1700 nm), more preferably it is at least 3 THz, still more preferably it is equal to about 4 THz. The receiver 120 is a corresponding opto-electronic device apt to receive the optical signal emitted by the transmitter and to decode the carried information. The optical line 130 may be formed by a plurality of sections of optical transmission media, such as for example optical fiber sections, preferably cabled. Between two adjacent sections of optical fiber, an optical or opto-electronic device is typically placed, such as for example a fiber splice or a connector, a jumper, a planar lightguide circuit, a variable optical attenuator or the like.

For adding flexibility to the system 100 and improving system functionality, one or a plurality of optical, electronic or opto-electronic devices may be placed along the line 130. In FIG. 1 a plurality of optical amplifiers 140 are exemplarily shown, which may be line-amplifiers, optical boosters or pre-amplifiers.

According to the present invention, the optical system 100 comprises at least one optical processing node (OPN) 150 optically coupled to the optical line 130 and apt to filter or route or add or drop or regenerate, fully or partially, at least one optical channel of the WDM optical signal propagating through the optical line 130. The OPNs are preferably dynamically tunable or reconfigurable. In the particular case wherein the optical processing node 150 is an optical add/drop node 150, as shown in FIG. 1, i.e., a node adapted to route or switch or add and/or drop, the routed or switched or dropped or added channel(s) may be received or transmitted by further receiver(s) 152 or transmitter(s) 154, respectively, which may be co-located with the OPN node or at a distance thereof. The optical system or network 100 may advantageously comprise a plurality of optical processing nodes. In FIG. 1 a further optical processing node 150' is exemplarily shown, together with its respective optional transmitting and receiving devices 152' and 154'.

An optical system 100 having optical add/drop nodes 150, as shown in FIG. 1, is commonly referred to as an optical network and it is characterized by having a plurality of possible optical paths for the optical signals propagating through it. As exemplarily shown in FIG. 1, a number of six optical paths are in principle possible, which corresponds to all possible choices of the transmitter-receiver pairs in FIG. 1 (excluding the pairs belonging to the same node).

According to the present invention, the tunable optical processing node 150 is suitable for independently filtering a plurality of optical channels and/or for filtering a single channel with a reduced tuning range of its constituent parts, being based on a scheme in accordance with the following.

Figure 2:
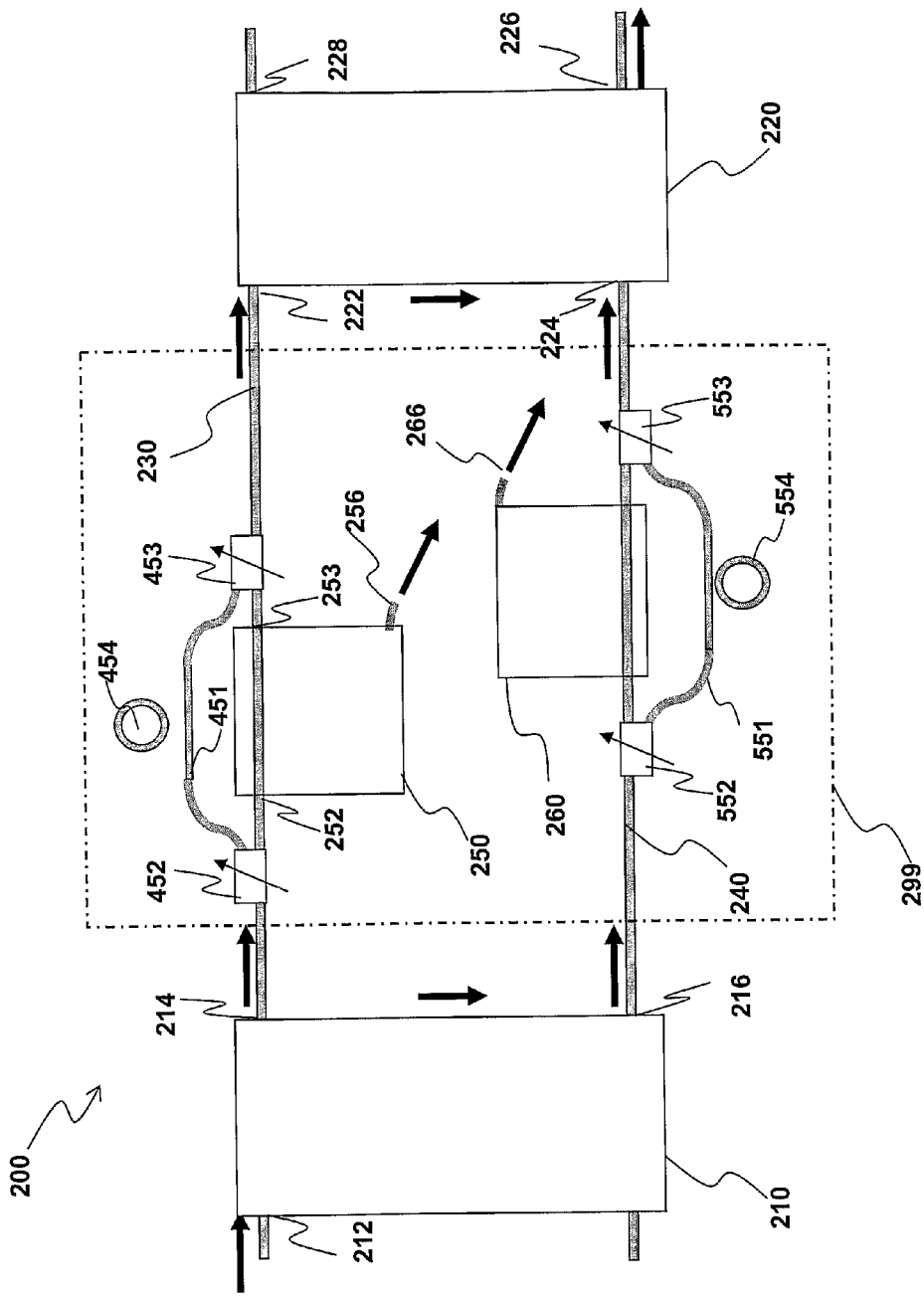
FIG. 2 is a schematic diagram showing in terms of functional blocks a scheme for tunable optical filtering according to the present invention.

FIG. 2 shows a schematic diagram of an optical device 200 in accordance with an embodiment of the present invention.

The general design scheme of the present invention comprises an optical splitter 210 with an input port 212 and a first 214 and a second 216 output port and an optical combiner 220 having a first 222 and a second 224 input port and at least one output port 226 or 228. Throughout the present description, the terms 'input' and 'output' are used with reference to a conventional direction of propagation of the optical radiation (in FIG. 2 exemplarily from left to right and from top to bottom, as indicated by the thick arrows), but, when in operation, the optical radiation may propagate in the opposite direction. A first optical path 230 and a second optical path 240 optically connect in parallel configuration the optical splitter 210 to the optical combiner 220. The first optical path 230 connects the first output port of the optical splitter 210 to first input port of the optical combiner 220. The second optical path 240 connects the second output port of the optical splitter 210 to the second input port of the optical combiner 220. The two optical paths 230 and 240 are preferably optically separated unless in correspondence of the optical splitter and combiner 210 and 220.

The optical splitter 210 is a splitting device having an optical power response at one of its two output ports, when a broad spectrum optical radiation is inputted in its input port 212, periodical with respect to the optical frequency, at least in an optical bandwidth of interest (e.g. 4 THz around 1550 nm or 193 THz). The optical power response of the other of its two output ports is typically the complementary function (1-f) of this optical power response, neglecting the loss introduced by the optical splitter itself. The distance between two successive peaks or maxima within such a periodical optical power response function is referred to as 'free spectral range' or FSR and will be generally expressed in optical frequency units. According to the present invention, the optical splitter 210 has a free spectral range corresponding to about the double of the frequency spacing of the allocated WDM frequencies. For example, given a frequency spacing of about 100 GHZ, the FSR is selected to be equal to about 200 GHz.

The 'cross-talk' of the optical splitter 210 is an optical parameter defined, at an output port, as the optical power level of an optical channel adjacent to a given optical channel corresponding to a peak or maximum of the optical power response at that output port, expressed in term of relative optical power with respect to the power of the given optical channel. The cross-talk of the optical splitter 210 of the present invention is preferably low, e.g. it may be less than about −10 dB, preferably less than about −15 dB, more preferably less than about −25 dB. Accordingly, and in other words, the optical splitter 210 is apt to receive at its input port 212 a WDM optical signal having a plurality of optical channels allocated on a WDM grid of (n) optical frequencies equally spaced by a given frequency spacing $\Delta f$ and occupying an optical bandwidth BW=(n−1)$\Delta f$, and to output at its first output port 214 a first portion of optical channels, substantially comprising all the channels which are allocated on a sub-grid (of the WDM grid) of optical frequencies equally spaced by the double of the given frequency spacing (2$\Delta f$), and to output at its second output port 216 a second portion of optical channels substantially comprising the remaining channels. Here the term 'substantially' is used to take into account the (typically unavoidable) cross-talk described above. The optical splitter 210 is preferably further selected so as to introduce low loss and/or low distortion (e.g. dispersion) to the split output channels. Assuming the n frequencies of the WDM grid being numbered with an index i from 1 to n, than the first portion of optical channels substantially comprises all the channels having frequencies with a given parity of the index (e.g. the 'odd' channels), and the second portion of optical channels substantially comprises the remaining channels having the opposite parity (e.g. the 'even' channels).

The optical combiner 220 is a combining device apt to receive in its two input ports 222 and 224 respective optical radiations propagating along the first and second optical path 230 and 240 and to combine them together so as to output the combined radiation into one of the two output ports 226 or 228, possibly with minimum loss and/or distortion. In a preferred configuration, the optical combiner 220 has the same structure of the optical splitter 210, i.e. the same layout of the constituting elements, so as to simplify the construction and/or the operation.

Preferably, a respective trimming device (not shown) is coupled to the optical splitter 210 and the optical combiner 220 in order to control ('trimming') the working point (i.e. the position of the resonances) of the optical splitter and of the combiner, such as for example in order to properly match the peaks of the respective power response with the grid of the WDM frequencies and/or to compensate for possible fabrication errors. In operation, such a working point may be kept fixed or it may be suitably tuned, typically within a tuning range equal to the frequency spacing, e.g. 100 GHz.

The optical splitter 210 and the optical combiner 220 may be any known device that meets the respective requirements described above. Each of them may be a resonant device, i.e. comprising one or more resonant cavities (or resonators), such as grating assisted couplers, Bragg grating based reflective splitters/combiners, Michelson Gires-Tournois resonator splitters/combiners, microcavity based splitters/combiners, microcavity-loaded Mach-Zehnder interferometer (MZI), or a non-resonant device, such as couplers (e.g. planar waveguide couplers), crystal splitters/combiners, polarization rotator splitters/combiners, MZI based splitters/combiners, or the like. A single resonant optical cavity has associated 'resonant wavelengths' (and corresponding 'resonant frequencies'), defined as those wavelengths which fit an integer number of times on the cavity length of the resonant optical cavity. For example a Bragg grating comprises a plurality of coupled resonant cavities. The distance between two adjacent resonant frequencies/wavelengths is referred to as the free spectral range (FSR) of the single resonator. In one embodiment, the resonant optical splitter 210 comprises one or more linear cavities (i.e. cavities each having a plurality of reflectors) or microring resonators or racetrack resonator or photonic band gap cavities or the like.

As shown in FIG. 2, according to the present invention a first optical filter 250 is optically coupled to the first optical path 230 and it is adapted to receive at least a portion of the optical radiation propagating through the first optical path 230 via an input port 252 and to output a transformed optical radiation via an output port 254 according to optical transfer functions (such as phase and power transfer functions). The optical filter 250 may be any optical device apt to give an optical transformation to the optical radiation propagating along the first optical path 230, being its optical transfer functions wavelength-dependent in the wavelength band of interest. In the present description, any physical quantity which substantially changes within the optical wavelength band of interest (e.g. 30 nm around 1550 nm) is referred to as being 'wavelength-dependent'.

The optical filter 250 is a resonant optical filter, i.e. it comprises one or more resonant cavities (or resonators), such as Bragg gratings or microcavities such as linear cavities, microrings, racetracks, photonic band gap cavities and the like. In a preferred configuration, the resonant optical filter 250 comprises microring or racetrack resonators. The transfer functions (e.g. phase, dispersion or power) of such a resonant optical filter 250 are typically characterized by strong wavelength dependence at and in the proximity of a resonant wavelength of one or more of its resonators. The perturbations of the overall power transfer function (hereinafter called resonances of the optical filter 250) are typically equally spaced in frequency and, in analogy with the definition given for the splitter 210, the distance between two adjacent resonances of the optical filter 250 is referred to as the 'free spectral range' of the resonant optical filter 250. In case all the resonators comprised within the optical filter have the same FSR, typically the FSR of the optical filter coincides with the FSR of the single resonators.

In a preferred configuration, the optical filter 250 is a tunable optical filter, i.e. it is apt to select an arbitrary optical channel to be filtered.

According to the present invention, the free spectral range of the first tunable resonant filter 250 is substantially equal to an odd multiple of the WDM frequency spacing and greater than half of the WDM optical bandwidth. In other words, the FSR of the optical filter 250 is given by: FSR=(2k+1)$\Delta f \pm X$ % $\Delta f$, being $\Delta f$ the frequency spacing and k any positive integer such that k>(BW−2 $\Delta f$)/4 $\Delta f$, being BW the optical bandwidth, or equivalently, k>($N_{ch}$−3)/4, being $N_{ch}$ the number of allocated WDM channels. It is noted that $N_{ch}$=BW/$\Delta f$+1. The term 'substantially' used above takes into account the ±X % $\Delta f$ term, wherein X is less than or equal to 50 or, preferably, less than or equal to 40 or, more preferably, less than or equal to 25. The value of ±50% $\Delta f$ may be suitable for a 10 Gbit/s NRZ or RZ channel bit-rate having 100 GHz or 50 GHz spacing. However this value may depend on transmission parameters such as the channel bit-rate and the frequency spacing and it is ultimately determined by the maximum allowable dispersion and/or loss on the channel near the parked resonance (see below). For a 40 Gbit/s NRZ or RZ channel bit-rate, a smaller value may be suitable, for example equal to ±25% $\Delta f$. For example, for a bandwidth equal to about BW=4000 THz and a frequency spacing equal to $\Delta f$=100 GHz (41 channels), than FSR=(2k+1)100±40 GHz, with k≥10, e.g. FSR=2100±40 GHz.

In a preferred embodiment the optical filter 250 is an optical add and/or drop filter (OADF) having at least a further optical port 256 ('drop port') having the function of dropping or adding, fully or partially, at least an optical channel within the optical band of interest propagating in the operating path 230. In other words, the power transfer function at the drop port 256 is typically characterized by high transmission peaks equally spaced in frequency by a quantity equal to the FSR of the optical filter. In a preferred embodiment, the OADF 250 has a still further optical port ('add port', not shown) which in combination with the further optical port 256 forms a pair of add and drop ports.

In a preferred configuration, the optical filter 250 has an associated bypass path 451 suitable to guarantee a hitless tuning of the optical filter itself. A first and a second optical switch 452 and 453 may optionally be optically coupled to the first optical path 230 and to the bypass path 451, as shown in FIG. 2.

The optical switch 452 is configured to assume alternatively a first and a second state, wherein an optical radiation propagating along the optical path 230 is directed, in the first state, substantially solely to the first optical path 230 and, in the second state, substantially solely to the bypass path. Preferably, the optical switch 452 switches from the first to the second state continuously, i.e. the splitting ratio of the output power of the two output ports switches from 0:100 to 100:0 and vice versa continuously. The second optical switch 453 has the same optical behavior of the first optical switch 452, provided that the second switch 453 is a "time-reversal copy" of the first optical switch 452, i.e. it operates in reverse with respect to the first switch. In one advantageous configuration, the second optical switch 453 is a structurally identical copy of the first optical switch 452 operating in reverse, i.e. the second optical switch 453 is a mirror symmetric copy of the first optical switch with respect to a vertical axis in the plane of FIG. 2. The first and the second optical switch 452 and 453 are configured to be operated in synchronous so as to maintain at any time during operation a symmetrical reciprocal configuration. The two optical switches 452, 453 may be actuated by any actuation technique (such as thermo-optic, MEMS actuated, electro-optic, acusto-optic, elasto-optic, stress, etc) so as to switch from the first to the second state and vice versa.

The first and second optical switch 452, 453 may be any arbitrary device that meet the above requirements, including variable couplers (such as planar waveguide couplers), variable Y branches, $\Delta\beta$ switches, alternating $\Delta\beta$ switches, Mach-Zebnder interferometer (MZI) based switches or the like. The first and second optical switch 452, 453 are preferably wavelength-independent over the allocated WDM bandwidth. For example, they may be identical MZI-based optical switches, each one comprising a balanced MZI having a pair of identical 3-dB optical couplers and a controllable phase shifter (for example thermally actuated) along one of the two arms.

Optionally, an all-pass filter 454 is optically coupled to the bypass path 451 and it is adapted to introduce a narrowband wavelength dependent phase change to the optical radiation propagating therethrough so as to match the phase distortion introduced by the tunable optical filter 250 at least at a channel neighboring the channel on which the optical filter 250 is tuned. The all-pass filter 454 comprises a resonant optical cavity. Strong wavelength dependence of the phase transfer function typically occurs in correspondence of the resonant wavelength(s). The all-pass filter has, in the wavelength band of interest, a wavelength independent power transfer function and a phase transfer function having a wavelength/frequency dependence which exhibits typical resonance induced behavior. Advantageously, the resonant all-pass filter 454 is apt to be tuned so that at least one of its resonant wavelengths overlaps to a resonant wavelength of the tunable optical filter 250 on the opposite path 230. Advantageously, the all-pass filter 454 is adapted to have a FSR selectable to be equal to the FSR of the tunable optical filter 250 so as to facilitate fabrication and phase matching. The resonant all-pass filter 454 is adapted to apply the correct phase distortion on channels adjacent to the filtered one while leaving substantially unaffected the signal amplitude.

In a preferred configuration, the all-pass filter 454 comprises a single resonator with a power coupling coefficient between the latter and the bypass path 451 advantageously selected to be equal to the sum of the power coupling coefficients of the stages (see below) of the filter 250 along the path 230. A single resonator all-pass filter 454 with the above characteristics helps minimizing the chromatic dispersion introduced by the all-pass filter.

According to the present invention, a second tunable optical filter 260 is optically coupled to the second optical path 240. The optical filter 260 is advantageously a resonant optical filter having optical filtering functionality similar to those of the first optical filter 250. The free spectral range of the second tunable resonant filter 260 is substantially equal to an odd multiple of the WDM frequency spacing and greater than half of the WDM optical bandwidth (FSR=$(2k+1)\Delta f \pm X \% \Delta f$, k>(BW−2 $\Delta f$)/4 $\Delta f$, or equivalently, k>($N_{ch}$−3)/4 and X≤50 or X≤40).

Preferably, the FSR of at least one of the first and second optical filter 250, 260 exceeds the half of the optical bandwidth by a quantity greater than the frequency spacing. In other words, k is selected such that k>BW/4$\Delta f$ or equivalently k>($N_{ch}$−1)4. According to the Applicant, the optimal choice for k is ($N_{ch}$−1)/4+1>k>($N_{ch}$−1)/4. Reasons for these selections will be given below. For example, for a bandwidth equal to about BW=4000 THz and a frequency spacing equal to $\Delta f$=100 GHz (41 channels), than FSR=$(2k+1)100\pm40$ GHz, with preferably k≥11. According to the Applicant, the optimal choice for k is k=11, i.e. FSR=2300±40 GHz.

For reasons of easy manufacturing and operation, it could be preferable that the FSR of the second tunable optical filter 260 has the same characteristics of the FSR of the first tunable filter 250. Preferably, the second optical filter has the same structure of the first optical filter 250, i.e. the same type and number of resonators, as well as the same layout of the resonators arrangement Accordingly, in a preferred configuration both the first and the second optical filter have the respective FSR exceeding the half of the optical bandwidth by a quantity greater than the frequency spacing.

The configuration of the optical device 200 according to the present invention allows the FSR of the first and second optical filter 250, 260 being advantageously smaller than said optical bandwidth, i.e. k<(BW−$\Delta f$)/2$\Delta f$, or equivalently k<($N_{ch}$−2)/2. More preferably, k is selected so that k<(3BW−4$\Delta f$)/8$\Delta f$, or equivalently k<($3N_{ch}$−8)/8. In the example above, advantageously, k≤18, and, more advantageously, k≤13.

Another advantage of the combination of the optical splitter 210 above and the first and second optical filter 250, 260 is that it relaxes the requirements of the optical filters in terms of roll-off because the optical filters receive portions of the WDM signal having a coarser grid (e.g. 200 GHz instead of 100 GHz). This allows for example the use of a drop filter having two-ring stages, as described below, instead of filters having three- or four-ring stages, which exhibit much more fabrication and operation challenges.

Optionally, the second optical filter 260 has an associated by-pass path 551 optically coupled to the second optical path 240 by way of respective optical switches 552 and 553 in the same way as described above with respect to the optical filter 250. Analogously, an optional all-pass filter 554 may be coupled to the bypass 551 in the same way and with the same functions as described above with reference to all-pass filter 454.

The combination of the first and second optical filter 250 and 260 is comprised in a filtering cell 299, e.g. a drop cell 299 having output port 256 or 266. The device 200 of the present invention is particularly suitable to filter a plurality of independent optical channels arbitrarily chosen in the WDM grid, by way of suitably cascading a corresponding plurality of filtering cells 299 along the direction of propagation of the optical radiation in the optical paths 230 and 240. Each filtering cell 299 is apt to filter one channel arbitrarily selected within the whole WDM grid and independently from the channels filtered by the other cells 299. The cascade of filtering cells 299 is comprised, with respect to said direction of propagation, between the optical splitter 210 and the optical combiner 220. The advantage of this solution is that the thru channels pass across the splitter 210 and the combiner 220 only once (and in a particular configuration only either one of the splitter 210 and the combiner 220), thus seeing limited overall dispersion by the device 200.

In the following, a method for optical filtering according to the present invention will be described. This method may be implemented by operation of the scheme of the optical device 200 of FIG. 2, described above. Where useful for the understanding of the method of the present invention, reference will be made to elements and corresponding reference numerals of FIG. 2, without restricting the scope of the method. The method is particularly suitable to filter at least an optical channel within a plurality of WDM channels, while leaving the thru channels with a minimum alteration or no alteration at all.

First, a WDM optical signal comprising a plurality of optical channels having respective optical frequencies lying on a grid ('WDM grid') of allocated frequencies equally spaced by a given frequency spacing, said grid occupying an optical bandwidth BW, is split, for example by way of the optical splitter 210, into a first and a second portion spatially separated. It is noted that the WDM optical signal does not necessarily need to comprise all the channels which may occupy said grid until it is filled. Actually, one or more of the allocated frequencies of the grid may be vacant. Nevertheless, the method and device of the present invention is suitable for processing a full-grid WDM signal and the examples below will refer to this case, without limiting the scope of the invention.

The first portion of the optical signal comprises a sub-group of said optical channels having optical frequencies lying on a first sub-grid having frequencies spaced by the double of said frequency spacing and the second portion comprises the remaining optical channels lying on a respective second sub-grid of frequencies. The first and second frequency sub-grids, respectively associated to the first and second portion, are complementary sub-grids of the grid of allocated WDM frequencies described above. Exemplarily, the first portion may comprise the channels having even parity and the second portion the channels having odd parity. In the present description, the expression 'belonging to the first/second portion' is equivalent to the expression 'having first/second parity'. In each portion, the residual optical power of the channels substantially belonging to the other portion with respect to the optical power of the first portion channels ('cross-talk') is below −10 dB. Preferably, the cross-talk is below −15 dB, more preferably below −20 dB. In the second portion, the cross-talk of the channels substantially belonging to the first portion may be approximately equal to the cross-talk in the first portion (as shown, e.g., in FIG. 8) or it may be worse (as shown, e.g., in FIG. 5).

An initial channel belonging to the first portion is filtered by way of a first resonant optical filter 250, adapted to act solely on the first portion, and tuned so that one of its resonance overlaps the optical frequency of said initial channel, one of the two adjacent resonances overlaps an optical frequency of the second sub-grid and the other adjacent resonance lies outside said optical bandwidth.

This is pictorially illustrated in FIG. 3A, wherein the horizontal axis represents the optical frequency. The left thick arrow represents the first allocated optical frequency of the WDM grid (Channel 1, conventionally taken as the origin of the axis, i.e. at 0 GHz) and the right thick arrow that of the last allocated frequency (Channel N, exemplarily at 4000 GHz for the $41^{st}$ channel of a 100 GHZ spacing full-grid signal). The thin arrows represent the resonances of the optical filter 250. The arrow 600 represents the 'active resonance', i.e. that resonance referred to above which overlaps the optical frequency of the initial channel to be filtered belonging to the first portion. Exemplarily, the initial channel may be the $26^{th}$ (even) channel at 2500 GHz. An adjacent resonance 610 (called 'inactive resonance') overlaps any allocated optical frequency of the second sub-grid (exemplarily, assuming an FSR of the optical filter 250 equal to 2300 GHz, the optical frequency at 200 GHz, i.e. the odd third channel). This has the advantage that, owing to the fact that no or very small optical power (related to the cross-talk) is present at this resonant frequency, the optical filter 250 typically interacts weakly, or not at all, with the optical power in correspondence of this frequency. If this interaction is not negligible, additional measures may be taken, as described below. In addition, being the resonance 610 placed in between two adjacent even channels, they are not significantly affected in terms of amplitude, phase and dispersion by the optical filter 250.

The other adjacent resonance 620 (called 'out-of-band resonance') is made to lie outside the optical bandwidth occupied by the grid of allocated frequencies (exemplarily at frequency 2500+2300=4800 GHz) and consequently it does not interact with the optical channels.

Occasionally, depending on the value of the FSR, it may happen that also the first adjacent resonance is made to lie outside the optical bandwidth occupied by the grid of allocated frequencies, for example in case the initial filtered channel lies at or in the proximity (i.e. within the range ±|FSR−BW/2−Δf|) of the center bandwidth. In the example above, where FSR=2300 GHz and center bandwidth BW/2=2000 GHz, in case the even filtered channel lies in the range 1800-2200 GHz (i.e. 1900 or 2100 GHz), both the two adjacent resonances falls outside the WDM bandwidth.

The feature of the FSR of the first and second optical filter 250 and 260 which is an odd multiple of the channel spacing and also greater than half of the occupied bandwidth, in combination with the first optical splitter splitting odd and even channels respectively to the first and second optical filter, allows to filter an arbitrary channel in an optical bandwidth while tuning the first and the second optical filter 250 and 260 by an FSR which may be smaller than said optical bandwidth (in the example above 2300 GHz instead of 4000 GHz for the second optical filter 260 and 2100 GHz or 2300 GHz for the first optical filter 250).

In case a by-pass path 454, together with switches 452 and 453 is present, the filtering of the initial channel is accomplished by acting on the optical switches 452 and 453 so as to maintain substantially all the optical radiation output from the output port 214 of the optical splitter 210 on the first optical path 230, so as to interact with the optical filter 250.

With reference to the second portion, at least one of the following two steps is performed.

1) The second portion is made to bypass a second optical filter 260, which is adapted to act solely on the second portion, and no interaction arises with it. This may be accomplished, with exemplary reference to FIG. 2, by properly actuating the switches 552 and 553 so as to direct the second portion to the bypass path 551. Preferably, the second optical filter 260 is tuned with one of its resonance in the proximity of the center of the WDM bandwidth. This solution 1) is preferable in case no all-pass filter 554 is present.

2) In case the second portion, e.g. by properly actuating the switches 552 and 553, is maintained onto the second optical path 240, the second optical filter 260 is tuned so that one of its resonances (referred to as the 'parked resonance') overlaps an optical frequency of the first sub-grid at or in the proximity of the center of the optical bandwidth of the WDM grid and the two respective adjacent resonances both lie outside said optical bandwidth ('out-of-band resonances'). This is pictorially illustrated in FIG. 3B, having the same conventional symbols of FIG. 3A. The thin arrows represent now the resonances of the optical filter 260. The arrow 700 represents the 'parked resonance' on top of an optical frequency of the first sub-group and the arrows 710 and 720 represent the two adjacent resonances which are made to lie outside the optical bandwidth occupied by the allocated frequencies grid and consequently they do not interact with the optical channels. Owing to the fact that no or very small optical power (related to the cross-talk) is present at the parked resonance frequency, the optical filter 260 typically interacts weakly, or not at all, with the optical power in correspondence of this frequency. If this interaction is not negligible, additional measures may be taken, as described further below.

In the example above, when also the second optical filter 260 has an FSR of about 2300 GHz, the parked resonance may correspond to the frequency of the $22^{nd}$ (even) channel at 2100 GHz or the $20^{th}$ channel at 1900 GHz in order to have both the two adjacent resonances falling outside the WDM bandwidth. This is the reason why the FSR of one of the two optical filters 250 and 260 (in the example above the second optical filter 260) is selected so as to exceed the half of the optical bandwidth by a quantity greater than the frequency spacing (k>BW/4$\Delta$f or equivalently k>($N_{ch}$−1)/4). In fact, assuming that the total number of allocated channels on the WDM grid is odd, in case the channel to be filtered is even, then the parked resonance of the inactive filter (i.e. the filter which is not filtering any channel and which is apt to act solely on the portion comprising the odd channels) needs to be parked on an even channel near the central frequency (which corresponds to an odd channel) of the bandwidth. Assuming the case of an even channel adjacent to the central channel, the smallest distance from the two ends of the bandwidth is equal to half of the optical bandwidth plus the frequency spacing and thus the FSR of this filter preferably exceeds this quantity (e.g. FSR=BW/2+3$\Delta$f). On the other end, in case the channel to be filtered is odd, then the parked resonance of the inactive filter (i.e. the filter apt to act solely on the portion comprising the even channels) needs to be parked on an odd channel which may be advantageously chosen as that corresponding exactly to the central frequency of the bandwidth. In this case, it is enough that the FSR of this optical filter (in the example above the first optical filter 250) exceeds the half of the optical bandwidth (e.g. FSR=BW/2+$\Delta$f).

In case the total number of allocated channels on the WDM grid is even, by suitably selecting the respective parked resonance as close as possible to the center of the WDM bandwidth, it is sufficient that the FSR of both the optical filters 250 and 260 is greater than half of the bandwidth (in addition to be an odd multiple of the channel spacing). For example, given a bandwidth BW=3900 GHz and a frequency spacing equal to $\Delta$f=100 GHz (40 channels), than FSR=(2k+1) 100±40 GHz, with k≥10. According to the Applicant, the optimal choice for k is k=10, i.e. FSR=2100±140 GHz.

Regarding the choice of performing step 1) or 2) above, it depends on the presence or not of the by-pass arms 451 and/or 551 of FIG. 2, with or without the all-pass filters 454 and/or 554, and on trade-off considerations. In case the by-pass arm 551 is present without the all-pass filter 554 (e.g. because it is not strictly necessary for having hitless switching), then it is preferable, according to the Applicant, to perform step 1) above because in this case the channels belonging to the second portion do not interact with the optical filter 260 and they are not affected by additional distortion along the by-pass path 551.

If the all-pass filter 554 is present for hitless purpose, then an optimal solution should be found choosing the lower between the dispersion introduced by the all-pass filter on the thru channels (of the second portion) when the optical filter is by-passed and the distortion (loss and/or dispersion) introduced by the optical filter on the thru channels adjacent the parked resonance when it is not by-passed.

The first and second portions of optical channels are then recombined, for example by way of the combiner 220.

In case the channel to be filtered need to be changed from the initial channel to a final channel (i.e. tuning of the optical device 200), the following steps may be preferably performed. Preferably, the initial and final channels are switched off. In case the final channel belongs to the same portion of the initial channel, i.e. the first portion, it is sufficient to tune, preferably hitlessly (see below), the first optical filter until one among the previously active resonance 600, the previously inactive resonance 610 or the other adjacent resonance 620 overlaps the final channel, depending on the relative position between the frequency of the final channel and those resonances. For example, the resonance 610 may be used to span over the (first portion frequencies in the) first half of the bandwidth and the resonance 600 to span over the (first portion frequencies in the) second half of the bandwidth. The second optical filter 260 may not need to be tuned, being already parked (or by-passed) on a proper frequency.

It will now be assumed that the final channel belongs to the second portion, i.e. the other portion with respect to the initial channel.

The second optical filter 260 is tuned until one of its resonances ('active resonance') overlaps the optical frequency of the final channel, one of the two adjacent resonances ('inactive resonance') overlaps an optical frequency of the first sub-grid and the other adjacent resonance is an out-of-band resonance. Occasionally, it may happen that also the first adjacent resonance is made to lie outside the optical bandwidth. The choice of the active resonance depends on the relative position between the frequency of the final channel and the resonances, as described above.

Preferably, the step above of tuning the second optical filter is performed hitlessly, e.g. exploiting the by-pass path 554. Assuming the case of step 1) above (optical filter 260 by-passed), at the end of the tuning of the optical filter 260 the second portion is redirected to the second optical path 240 by way, e.g. of the synchronous switches 552 and 553. In the further case of using an all-pass filter 554, this is tuned, before having completely actuated the switches 552 and 553, so as to match the phase distortion introduced by the optical filter 260, at least in correspondence of the WDM channels neighboring the final one. This phase matching is achieved at least for the two channels immediately adjacent, and having the same parity of, the processed one. Typically, no phase matching is achieved at the frequency of the final channel. Typically, the all-pass filter 554 is tuned until one of its resonant wavelengths overlaps the frequency of the final channel on which it is also being tuned the optical filter 260. Then, the optical switches 552 and 553 may be synchronously switched so as to direct the WDM second portion from the by-pass path 551 to the second optical path 240. In all the intermediate states during the switching operation, the two fractions of the second portion propagating respectively along the two optical paths remain in a phase relationship which is suitable to properly recombine in the optical switch 553 so as to be entirely outputted in the proper output port (corresponding to the optical path 240) of the optical switch 553 without loss and/or distortion.

Assuming the case of step 2) above (optical filter not by-passed), the second portion may be first redirected to the by-pass path (possibly exploiting the all-pass filter 554 as described above), then the optical filter 260 is tuned (e.g., the parked resonance 700 may be tuned so as to become an active resonance on a channel belonging to the second portion) and then the procedure of redirection described above may be applied.

With reference to the first portion, at least one of the following two steps is performed.

A) The first portion is made to bypass the first optical filter 250 so that no interaction arises. This may be accomplished, e.g., by properly actuating the switches 452 and 453 so as to direct the first portion to the bypass path 451. Preferably, the first optical filter 250 is tuned with one of its resonance in the proximity of the center of the WDM bandwidth. This solution A) is preferable in case no all-pass filter 454 is present.

B) The first optical filter 250 is tuned until one of its resonances ('parked resonance') overlaps an optical frequency of the second sub-grid at or in the proximity of the center of the optical bandwidth of the WDM grid and the two respective adjacent resonances both lie outside said optical bandwidth and consequently they do not interact with the optical channels. The same considerations above with regard to the FSR of the optical filter 260 and the hitless tuning may be applied to the optical filter 250. Again, owing to the fact that no or very small optical power (related to the cross-talk) is present at the parked resonance frequency, the optical filter 250 typically interacts weakly, or not at all, with the optical power in correspondence of this frequency. If this interaction is not negligible, additional measures may be taken, as described further below with reference to stage 270 of FIG. 10.

Optionally, in case they were switched-off, the initial and final channels are now switched-on. Said final channel is now filtered by way of said second optical filter 260; for example it may be dropped.

During the entire operation, the thru channels remain substantially unaffected.

The method(s) of tunably filtering an optical channel described above are particularly suitable in case more than one independent channels are to be filtered while reducing at a minimum the loss and/or distortion of the thru channels. Those methods, as well the corresponding devices 200, may be implemented without the need of tuning the resonances, i.e. changing the operation point, of the optical splitter and combiner 210 and 220. Indeed, they may be kept, during operation, at a fixed operation point, by way, e.g., of a trimming device. This is made possible by the particular combination of the optical splitter and combiner 210 and 220 and of the first and second optical filter 250, 260 described above, which also allows the cascade of filtering cells 299 as previously described.

In case a plurality of channels are to be filtered with loose requirements for dispersion or loss (e.g. greater than 20 ps/nm or greater than 50 ps/nm), it is possible to cascade the whole structure comprising the optical splitter and combiner 210 and 220 and the first and second optical filter 250, 260 described above, once for each channel to be filtered, and to operate the resulting device according to the methods above.

In the special cases wherein only a single channel out of the WDM signal needs to be filtered or a plurality of independent channels need to be filtered but without strict requirements on the distortion and/or loss suffered by the thru channels, then it is possible to implement the following alternative method of tunably filtering an optical channel. The main difference of this method with the previous ones is that now the optical splitter and combiner 210 and 220 are operated so that their resonances are not kept fixed, but they are tuned over a respective tuning range equal to about the WDM frequency spacing. The tuning of the latter devices may be accomplished by respective tuning devices (not shown in the figures) in all similar to those suitable for trimming them as previously described. The main advantage of this solution is that the range of tunability of the optical filter 250 and 260 is further reduced to about half FSR, while keeping the ability to filter an arbitrary channel in the whole WDM bandwidth.

In a starting operative condition, the optical filter 250 has an active resonance on an initial channel having a given parity (first portion) and the optical filter 260 is parked or by-passed as previously described with reference to FIG. 2 and FIGS. 3A,B. For illustrative purpose, the WDM bandwidth is assumed to be partitioned in four portions, approximately corresponding to the four quarters and illustratively shown in FIGS. 3A,B. The quarters are to be intended as not limiting the present invention, for example the bandwidth may be partitioned as 0.2-0.3-0.3-0.2 or 0.23-0.27-0.23-0.27.

In case the final channel belongs to a quarter having the same parity (i.e. $1^{st}$-$3^{rd}$ or $2^{nd}$-$4^{th}$) of the quarter of the initial channel and has the same parity of the initial channel, it is sufficient to tune, preferably hitlessly (see above), the first optical filter until either the previously active resonance 600 or the previously inactive resonance 610 overlaps the final channel, depending on the relative position between the frequency of the final channel and those resonances. For example, the resonance 610 may be used to span over the first quarter of the bandwidth and the resonance 600 to span over the third quarter of the bandwidth. The optical splitter and combiner 210 and 220 and the second optical filter 260 may not need to be tuned. In case the final channel belongs to a quarter having the same parity of the quarter of the initial channel but has opposite parity with respect to the initial channel, then, in addition to tune the first optical filter as above, also the optical splitter 210 is tuned by one frequency spacing, so that now the second portion is made to interact with the first optical filter 250 and the first one is sent in place of the second portion. The second optical filter 260 (when not by-passed) may need to be tuned so that its parked resonance is placed on top of a frequency belonging to the second portion.

It will now be assumed that the final channel belongs to a quarter having opposite parity with respect to the quarter of the initial channel.

In case the final channel has opposite parity with respect to the initial channel, then the second optical filter 260 is tuned (possibly hitlessly, see above) until one of its resonances ('active resonance') overlaps the optical frequency of the final channel, one of the two adjacent resonances ('inactive resonance') overlaps an optical frequency of the first sub-grid and the other adjacent resonance is an out-of-band resonance. The choice of the active resonance depends on the relative position between the frequency of the final channel and the resonances, as described above.

With reference to the first portion, at least one of the following two steps is performed.

A) The first portion is made to bypass the first optical filter 250 as previously described.

B) The first optical filter 250 is parked on an optical frequency of the second sub-grid at or in the proximity of the center of the optical bandwidth of the WDM grid.

In case the final channel has the same parity of the initial channel, then in addition to tuning the second optical filter 260 as above, also the optical splitter 210 is tuned by one frequency spacing, so that now the first portion is made to interact with the second optical filter 260 and the second one is sent in place of the first portion.

As above, the first optical filter 250 (when not by-passed) is parked on an optical frequency of the first sub-grid at or in the proximity of the center of the optical bandwidth of the WDM grid.

Optionally, in case they were switched-off, the initial and final channels are now switched-on.

A possible way of realization of the optical device 200 suitable to implement the latter method above, is to manufacture the resonators of the two optical filters in such a way that at a given operative condition (e.g. given respective temperatures), the distance between the resonances 600 and 700 is about a quarter of bandwidth. This can be achieved in practice by suitably trimming the structure of the optical waveguide of the microrings (e.g. by e-beam dose trimming during lithography or UV-curing of a suitable cladding).

Moreover, a bypass may be used to bypass the whole structure comprising the splitter 210, the cell 299 and the combiner 220 in the same way as described above.

Figure 4:
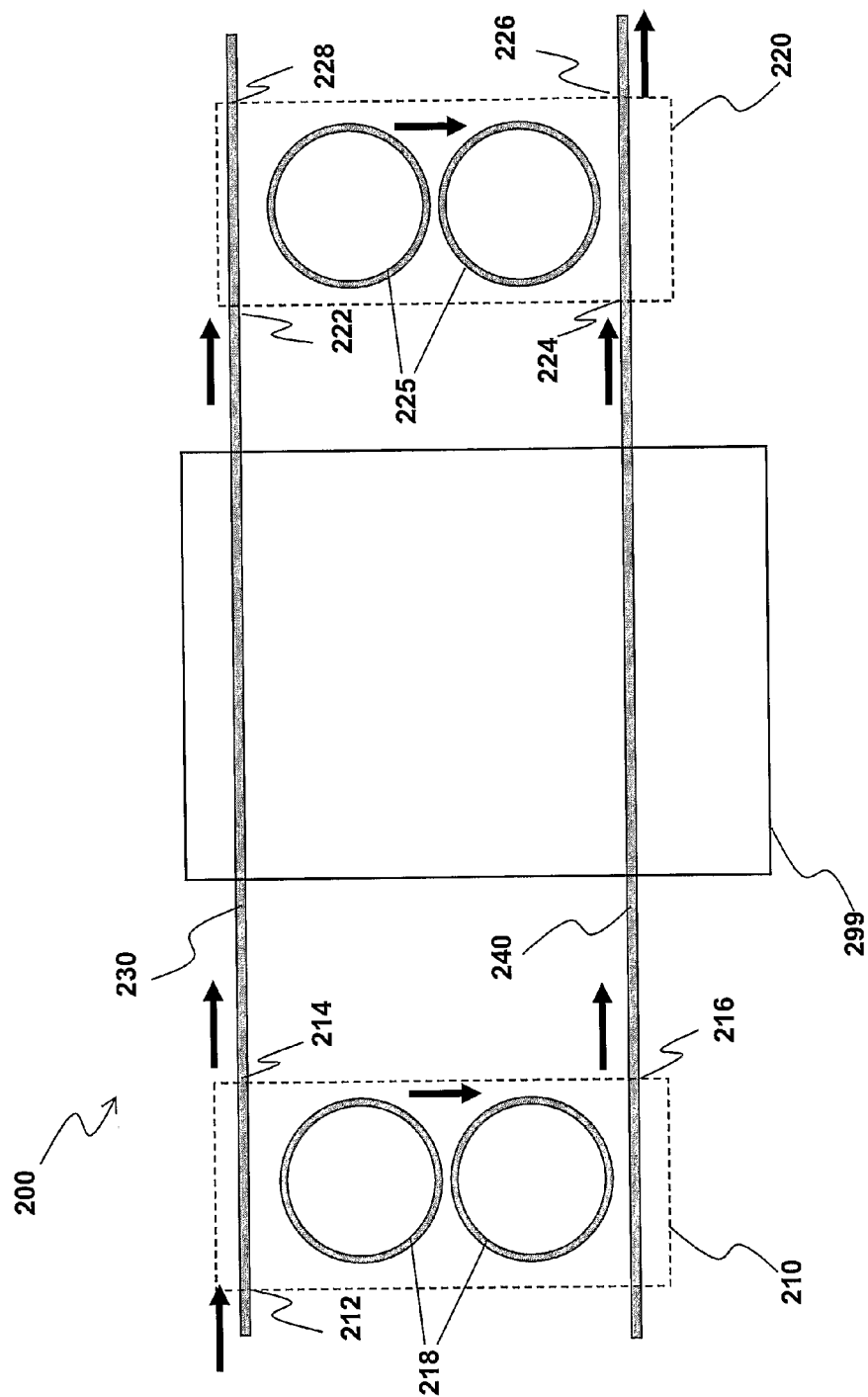
FIG. 4 shows in terms of functional blocks an exemplary configuration of an optical splitter and an optical combiner comprised within the device for tunable optical filtering according to the present invention.

FIG. 4 shows an exemplary embodiment of the resonant optical splitter 210 which comprises one or a plurality of resonators 218 (e.g. microring or racetrack resonators) optically coupled to, and interposed between, two optical waveguides, the latter typically corresponding to the first and the second optical path 230, 240 or being coupled thereto. In case of a plurality of resonators, they may be coupled in parallel between the two optical paths or, preferably, in series as shown in FIG. 4. Preferably the coupled resonators are less than four, more preferably they are two or three. In case of two microring resonators 218 as shown in FIG. 4, they typically have the same ring radius so that the free spectral range of the single resonators are all equal and they are also equal to the FSR, as defined above, of the whole optical splitter 210. When a resonant splitter 210 according to this particular configuration is in operation, the optical channels input into the input port 212 which are output into the second output port 216 coupled to the second optical path 240 (i.e. those channels belonging to the second portion, e.g. the even channels) are those channels having optical frequencies which match the resonances of the resonators 218 and they physically travel across the resonators 218, as indicated by the down-arrow near microrings 218.

Figure 5:
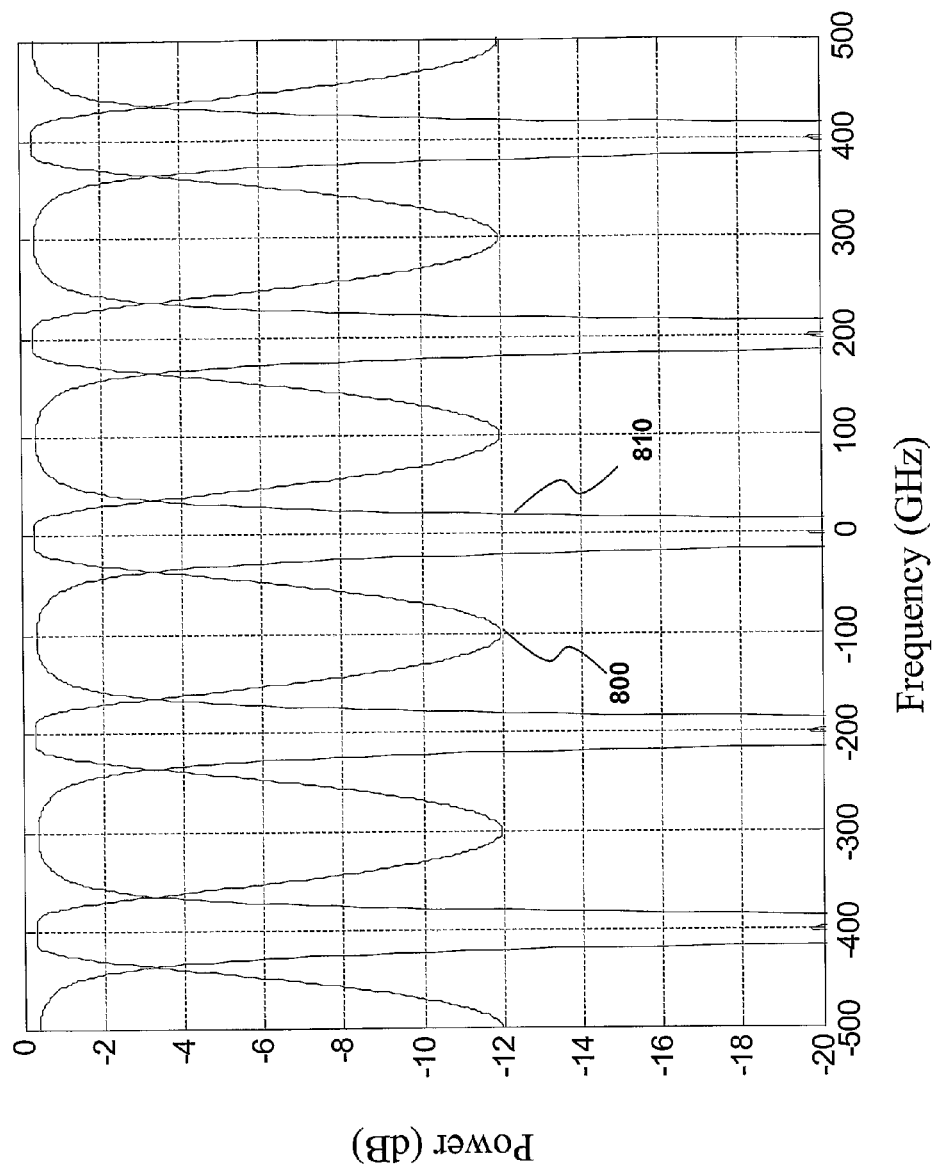
FIGS. 5 and 6 respectively show the calculated amplitude and dispersion response of the optical splitter comprised in the filtering device of FIG. 4.

In FIG. 5, there are shown the calculated optical power response curves for the first output port 214 (curve 800) and the second output port 216 (curve 810) of an exemplary single optical splitter of the kind of the optical splitter 210 shown in FIG. 4, which comprises two series coupled microring resonators. Here the zero frequency conventionally corresponds to a frequency of a channel belonging to the second portion, i.e. a channel substantially output at the second output port 216. A rigorous transfer matrix approach and a 3D Finite Difference Time Domain approach have been respectively used for the calculation of the transfer functions and of the actual dimensional layout of the optical components of the present description. Throughout the present description, the TE polarization mode has been investigated, without restricting the scope of the present invention.

Silicon has been selected as core material of the waveguides constituting both the resonators 218 and the optical paths 230, 240. The choice of silicon is due to its high thermo-optic effect which enables a high degree of tunability. Silica may be used as a cladding material surrounding the silicon waveguide core, e.g. in a buried or channel or ridge waveguide. Alternatively other kind of materials could be used as cladding such as: polymers, spin on glass i.e. HSQ, Si3N4, etc. The high index contrast waveguide obtained by the above material systems allows fabricating microring resonators with very small radius and negligible bending losses. Si waveguides height may suitably be in the range of 100-300 nm and its thickness in the range of 200-600 nm. In the example described in FIG. 5 Si waveguide cross section is about 500 nm width and 220 nm height. A Sio2 top cladding with a refractive index of $n_{clad}$=1.446 has been included in the design. Silicon refractive index has been taken equal to 3.476.

In calculating the optical responses, it has been assumed a realistic value for the total loss of the substantially straight (i.e. negligible bending radiation losses) silicon waveguides (e.g. 230, 240) and of the microring waveguide 218 of respectively 3 dB/cm and 10 dB/cm. The present invention equally applies in case of different values of losses. The calculated effective and group indexes of the Si waveguide were respectively in the range of about 2.43-2.48 and 4.21-4.26. The ring radius of the resonators 218 is 55(±1%) µm which corresponds to an FSR of about 200 GHz. The ring to bus and ring to ring power coupling coefficients are respectively 74% (±5%) and 44% (±5%), which may be exemplarily obtained by a ring to bus gap equal to 120 nm and a ring to ring gap equal to 140 nm.

It is noted that the cross-talk at the second output port is better (smaller) than the cross-talk at the first one. The in-band ripple is less than about 0.2 dB and the insertion loss less than about 1 dB.

Figure 6:
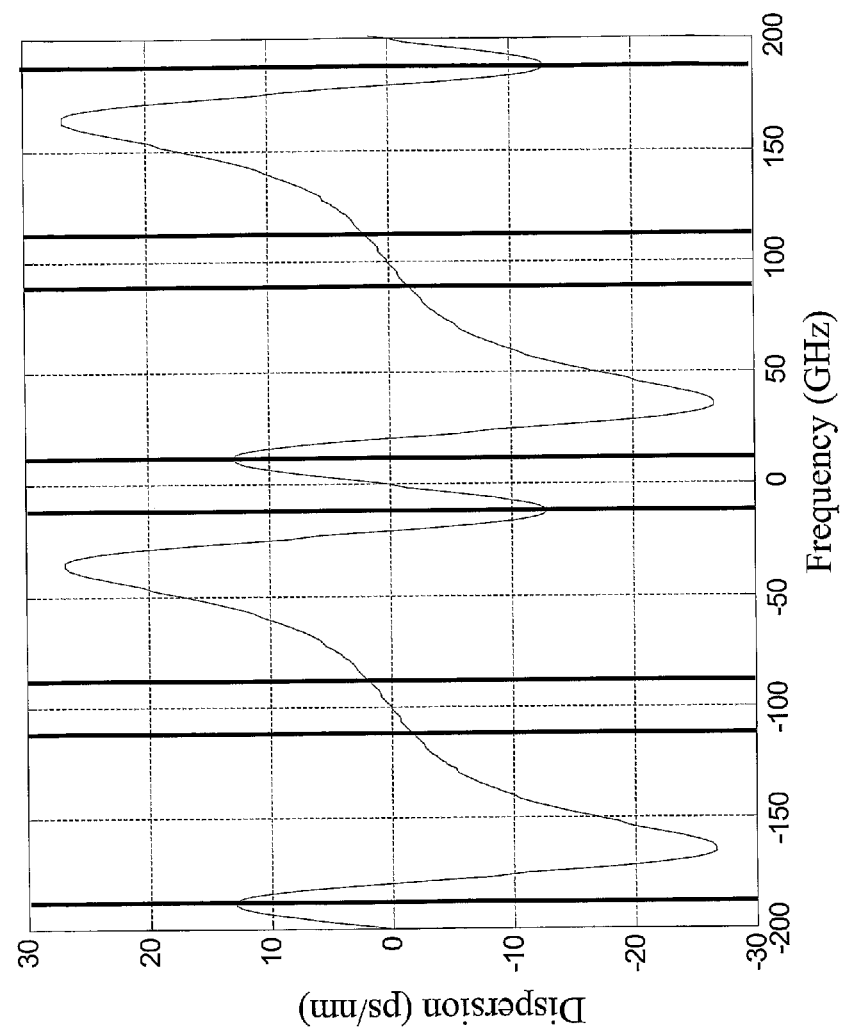

In FIG. 6, it is shown the corresponding dispersion response function of the exemplary optical splitter 210 described with reference to FIG. 5. Both the first and the second output port 214, 216 exhibit the same dispersion curve shown in FIG. 6. Here the zero frequency is the same of FIG. 5 described above. The channels at zero and ±200 GHz are channels in resonance with the microrings 218 and they have crossed the resonators 218, while those at ±100 GHz are non resonant channels which remain on the optical path 230. It can be seen that the dispersion introduced by the exemplary optical splitter 210 on the resonant channels (within the channel bandwidth of ±12.5 GHz around the central frequency of each channel) remains below 20 ps/nm, which is an acceptable limit even thought not negligible. On the other hand, the non-resonant channels are affected by a negligible dispersion. There is consequently an asymmetry between the channels that are non-resonant and the ones which are resonant with resonators 218, the latter being disadvantaged in terms of losses, polarization dependent loss and dispersion.

A maximum value of ±20 ps/nm of the dispersion added to the thru channels (by the whole optical device 200) is usually specified, while a more relaxed specification (i.e. ±80 ps/nm) is generally required for the dropped channel(s). This is because the dropped channel is usually immediately detected while the thru channels may travel through several OADM nodes before being detected so that dispersion accumulation has to be avoided. With reference to FIG. 4, it is noted that in case the optical combiner 220 has the same structure of the optical splitter 210 and it is also tuned, or trimmed, so that its resonances overlap with the resonances of the optical splitter 210, than the resonant channels, in operation, first cross the resonators 218 of the splitter 210 and then those 225 of the combiner 220, as described in prior art, e.g. in U.S. Pat. No. 6,839,482. The acquired dispersion of the resonant channels would sum up twice, thus reaching the maximum acceptable level, while non-resonant channels are substantially unaffected. The thru output would be consequently strongly not equalized and would be difficult to meet the specification of the filter especially in term of dispersion. Analogously, in case more than one channels need to be independently filtered, cascading the whole structure comprising the splitter 210, the cell 299 and the combiner 220 more than once, as suggested in prior art, e.g. in U.S. Pat. No. 6,839,482, would again result in the dispersion acquired by the thru channels in the splitter 210 and/or the combiner 220 to sum up and reach the maximum specification.

Figure 7:
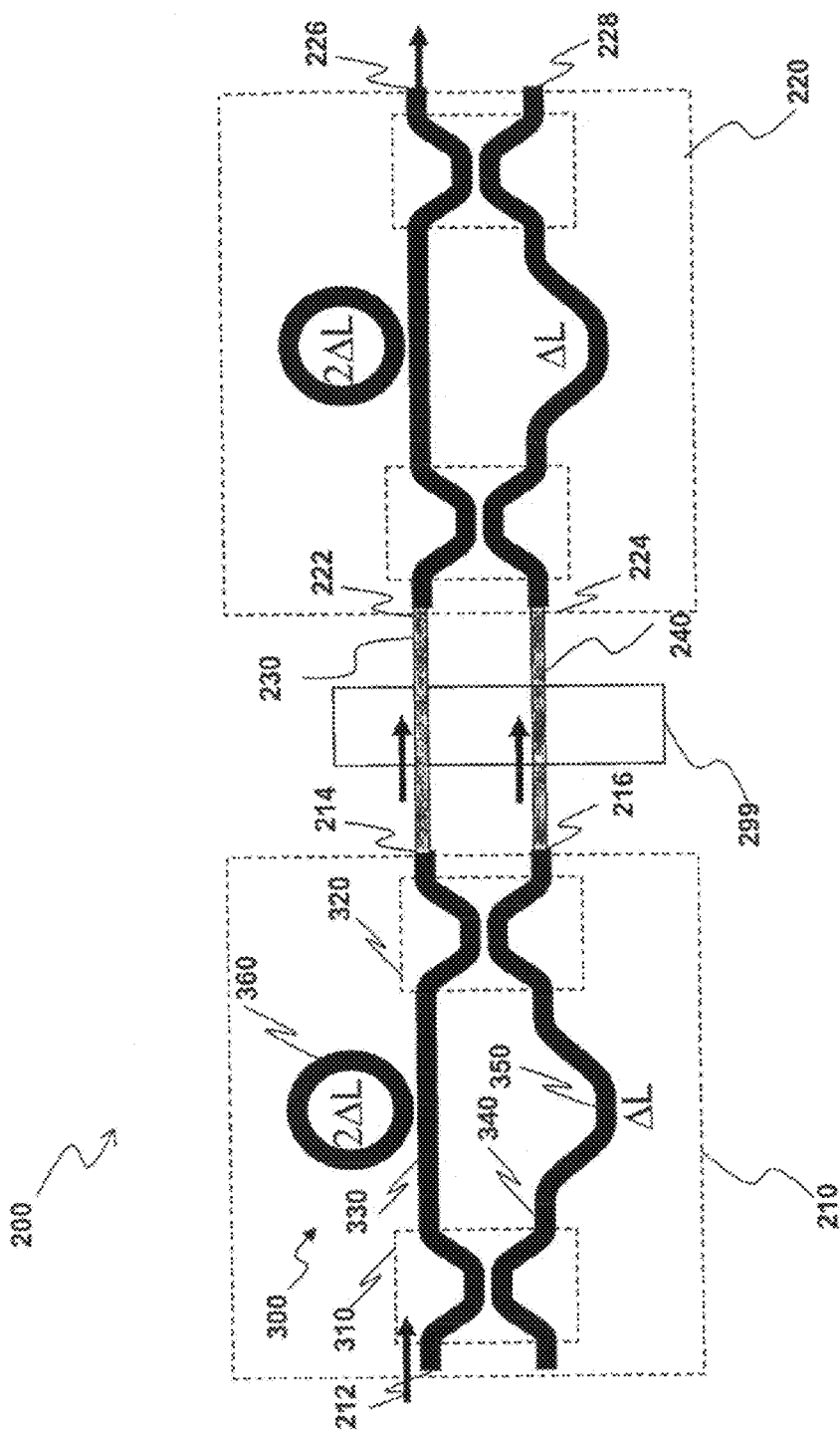
FIG. 7 shows an exemplary alternative configuration of an optical splitter and an optical combiner comprised within the device for tunable optical filtering according to the present invention.
Figure 10:
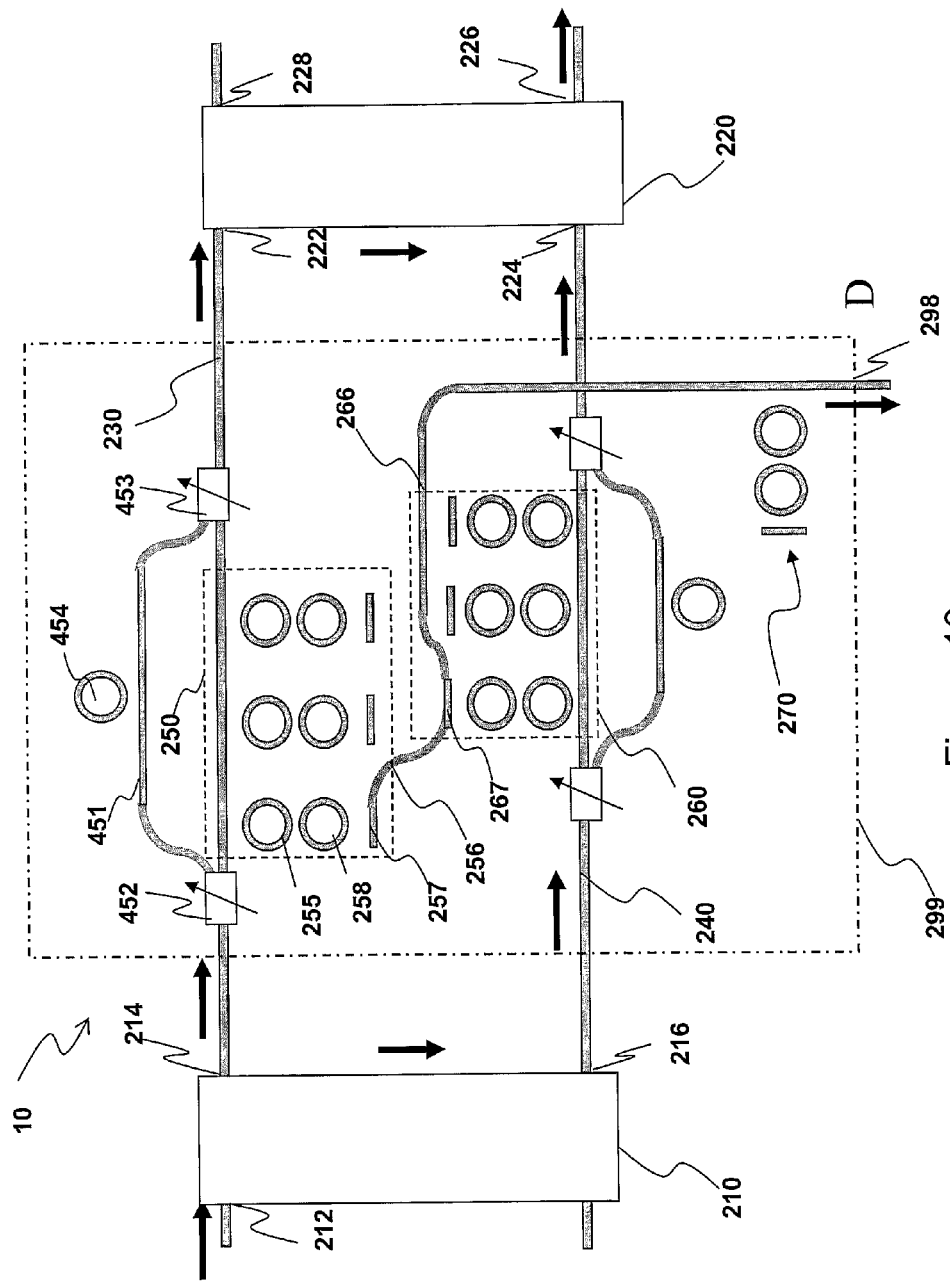
FIG. 10 shows in terms of functional blocks an exemplary configuration of a device for tunable optical add and/or drop multiplexing according to the present invention.

The optical components described in the present description, such as the optical splitter 210 of FIG. 4 or FIG. 7 and the optical filter 250 or 260 of FIG. 10, may be fabricated by any fabrication process known in the field of integrated optics, such as a layering process on a substrate, e.g. an SOI wafer having a thickness of the buried oxide in the range of 3-10 microns and a thickness of the top Si in the range of 50-1000 nm. The layering process may include the e-beam lithography and etching steps. A $SiO_2$ layer could be deposited as a top cladding.

In the exemplary embodiment of FIG. 4, the optical combiner 220 is structurally identical to the optical splitter 210 so that a resonant recombination takes place at the combiner 220 with minimum loss. In one embodiment, it may be also trimmed in the same way as the optical splitter 210, i.e. with its resonances substantially overlapping those of the optical splitter 210. In this case, the non-resonant channels belonging to the first portion will propagate along the first optical path 230 and will pass thru the optical combiner 220 and will be output into the output port 228 corresponding to the first optical path. The optical channels of the second portion in the second optical path 240 are input at the input port 224 of the combiner and, being resonant with its microrings 225, they travel across the latter and are output at the same output port 228. Thus, as clear from FIGS. 5 and 6, they are affected by twice the dispersion of FIG. 6 due to the microrings.

In a preferred alternative embodiment, the combiner 220 is trimmed by the respective trimming device so that its resonances are detuned in frequency by one half of its FSR (e.g., 100 GHz detuning for a 200 GHz FSR) with respect to the resonances of the optical splitter 210. In other words, if the optical splitter 210 is configured so as to deviate, in operation, toward the optical path 240 the even channels, the optical combiner 220 is configured so as to deviate, in operation, the odd channels toward the optical path 240 and vice versa. The optical combiner 220 is trimmed so that its resonances are interleaved with those of the optical splitter 210. In other words, if the optical splitter 210 resonates at, e.g., the even channels, the optical combiner 220 is made to resonate, by the trimming device, at the odd channels. Accordingly, the non-resonant (with respect to the combiner 220) channels propagating along the second optical path 240 will not leave the optical path 240 and will be output into the output port 226 corresponding to the second optical path 240. The resonant (with respect to the combiner 220) channels in the first optical path 230 will propagate crosswise the resonators of the combiner 220 and will be also output into the same output port 226, as indicated by the thick arrows in FIGS. 2 and 4. Advantages of this particular configuration is that every single channel will propagate crosswise only either the optical splitter's resonator(s) or the optical combiner's resonator(s), thus having the result of an output WDM signal at the output port 226 with more homogeneous channels than in the alternative configuration above, both in optical power (loss, PDL, etc.) and in optical distortion, such as phase distortion and/or dispersion.

FIG. 7 shows a further possible configuration of the resonant optical splitter 210 which comprises a resonator-loaded MZI 300. In FIG. 7 like reference numerals have been used for like elements with respect to FIGS. 2 and 4. The resonator-loaded MZI may be any resonator-loaded MZI known in the art. Exemplarily, it may comprise a first 310 and a second 320 3-dB optical splitter, a first 330 and a second 340 optical path (called 'arm') optically connecting in parallel configuration the first and the second optical splitter, wherein the second optical path comprises an extra-length $\Delta L$, or a corresponding phase shifting device, 350 with respect to the first optical path 330, and wherein a resonator 360 (exemplarily a microring) is optically coupled to the first optical path. Equivalently, any resonant cavity (linear, racetrack, etc) may be used as resonator 360. The resonator 360 is adapted to act as an all-pass filter with respect to the optical radiation propagating along the arm 330. The length of the resonant cavity 360 is equal to about 2 $\Delta L$, so that the corresponding FSR of the resonant cavity 360 is approximately equal to the WDM frequency spacing. Preferably the first and second optical splitter 310 and 320 are broadband 3-dB optical splitter, at least as broad as the WDM optical bandwidth. For example, they may be MZI-based 3-dB planar couplers, as known in the art, or adiabatic 3-dB couplers as described, e.g., in Y. Shani et al., IEEE J. of Quantum Electronics, Vol. 27, No. 3, March 1991, pp. 556-566. Advantageously, the optical combiner 220 may have the same structure as shown in FIG. 7. In this case, the optical combiner 220 may be oriented in tha same way as the optical splitter 210 (as shown in figure) or it may be oriented in a point-symmetric configuration with respect to the optical splitter 210 (e.g., in FIG. 7 the respective ring may be coupled to the bottom waveguide and the extra-length to the top waveguide).

Figure 8:
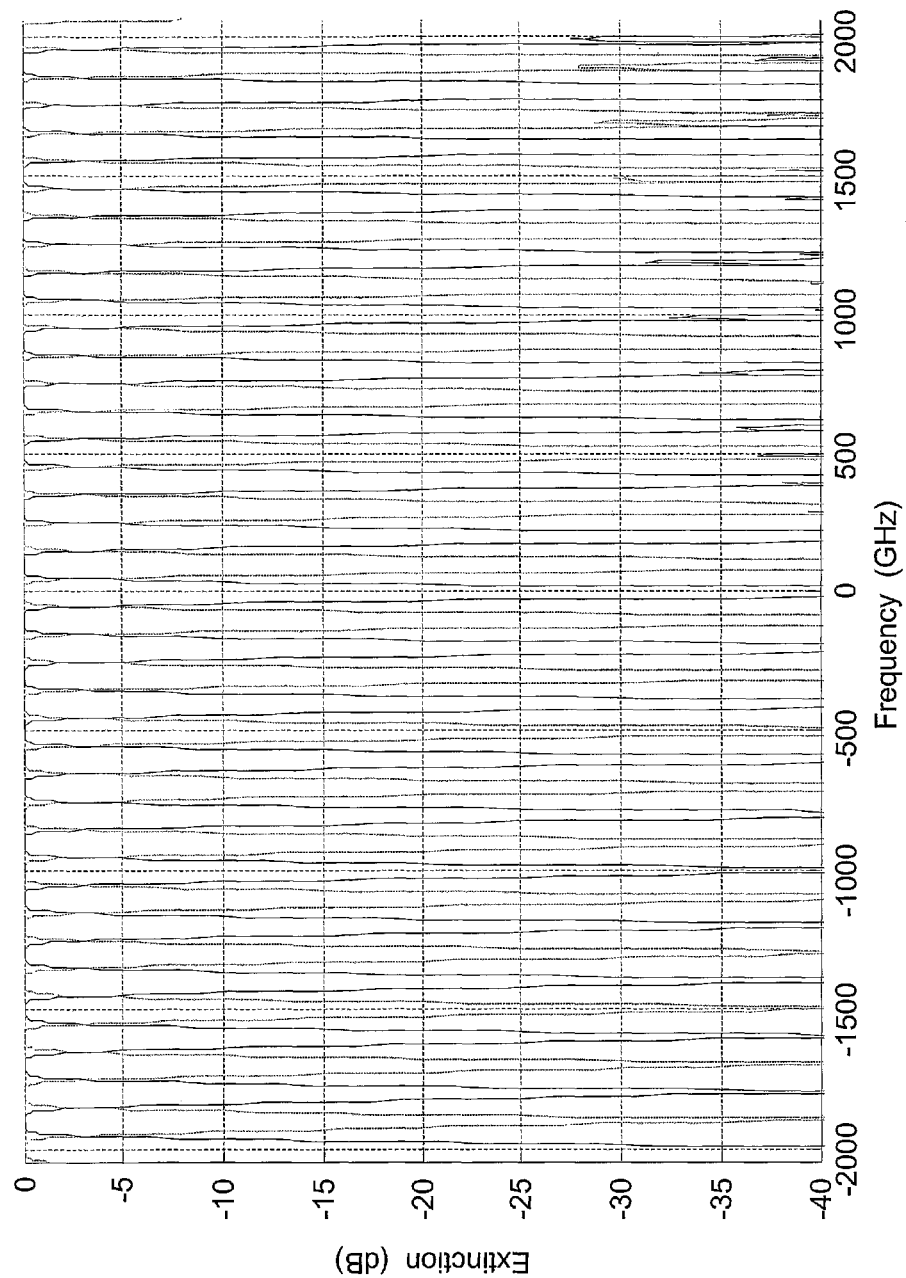
FIGS. 8 and 9 respectively show the calculated amplitude and dispersion response of the optical splitter shown in FIG. 7.

In FIG. 8, there are shown the calculated optical power response curves for the first output port 214 (continuous curve) and the second output port 216 (dashed curve) of an exemplary optical splitter 210 comprising a resonator-loaded MZI 300, as shown in FIG. 7. Silica-buried silicon waveguides have been used both for the resonator 360 and the waveguides 330, 340. The ring radius of the resonator 360 is 113 µM which corresponds to an FSR of the single resonator 360 of 100 GHz. The ring to bus coefficient is 87% (suitable range 82%-92%), which may be obtained with a gap of about 120 nm. The cross section of the rectangular waveguides was 490 nm wide and 220 nm high. The zero frequency in FIG. 8 corresponds to a wavelength equal to 1544 nm. The insertion loss for all the channels ranges from 0.1 to 0.5 dB, the ripple remains below 0.1 dB and the cross talk within the channel bandwidth remains below (better than) about −25 dB for ideal 50-50 couplers 310, 320, below about −20 dB for 48-52 couplers and below −15 dB for 45-55 couplers. All the design parameters not expressly cited in this section (such as propagation losses of the straight and bent (microring) waveguides, effective and group indexes, etc.) have been assumed equal to those used for FIGS. 5 and 6.

It is noted that the cross-talk of the ring-loaded MZI 300 is better than that of the exemplary series-coupled resonators splitter 210 of FIG. 4 and that the power response is symmetric with respect to the first and the second portions of channels.

Figure 9:
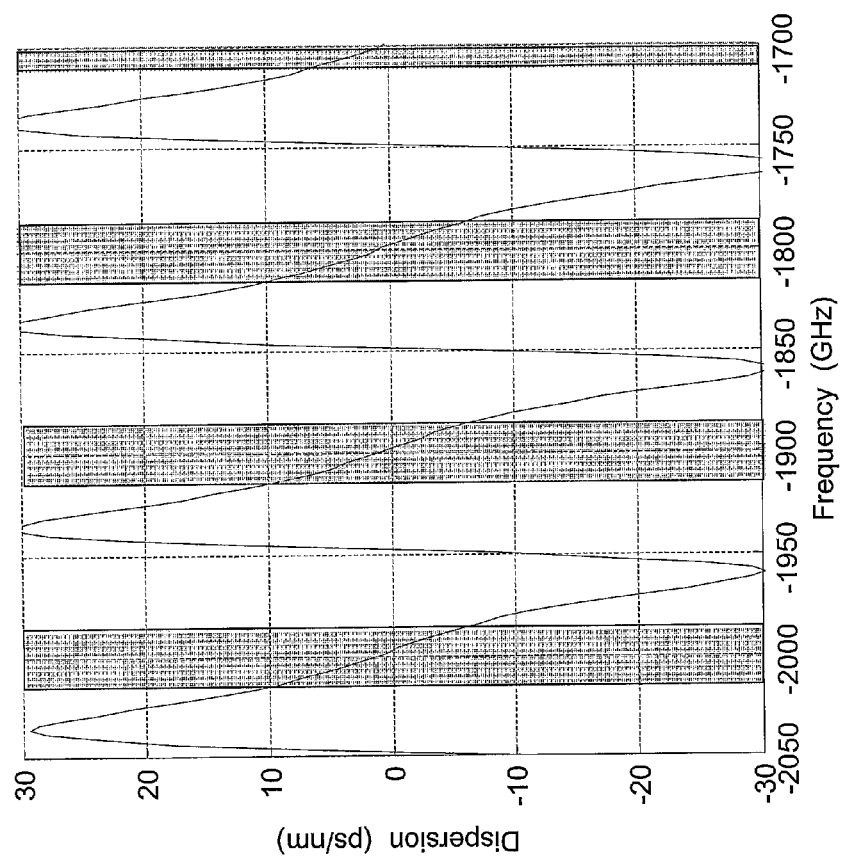

In FIG. 9, it is shown the dispersion response function of the exemplary optical splitter 210 described with reference to FIGS. 7 and 8. Both the first and the second output port 214, 216 exhibit the same dispersion curve shown in FIG. 9. Here the frequency scale is the same of FIG. 8. It can be seen that the dispersion introduced by the exemplary optical splitter 210 of FIG. 7 on all the channels (within the channel bandwidth of ±12.5 GHz around the central frequency of each channel) remains below about 10 ps/nm and well below 20 ps/nm and that there is a symmetric dispersion response with respect to the first and the second portions of channels.

With reference now to FIG. 10, an exemplary realization of a tunable optical add and/or drop multiplexing device OADM 10 in accordance with the present invention will now be described. Where appropriate, the same reference numerals of FIG. 2 for like elements have been used and, for these elements, reference is made to the description above.

The filter cell 299 of the OADM 10 is a tunable optical add and/or drop cell 299 wherein the first and the second resonant-type optical filters 250, 260 are tunable optical add and/or drop filters (OADF) 250, 260 comprising microring resonators. The optical filters 250 and 260 are exemplarily structurally identical and the following description of the optical filter 250 equally applies to the optical filter 260 (wherein the second optical path 240 takes the place of the first optical path 230). It is to be understood that the microring resonators of the embodiment of FIG. 10 may be replaced by any suitable resonator, such as racetracks, waveplates, etc. The first optical filter 250 comprises a first stage adapted to drop (or add) a WDM channel from (or into) the first optical path 230. The first stage comprises at least a microring 255 optically coupled to the optical path 230 and to a drop waveguide 257 in series configuration, which means that, in operation, the optical radiation resonant with the microring propagates from the optical path 230 to the microring and then to the drop waveguide 257. The drop port 256 of the optical filter 250 may belong to the drop waveguide 257, as shown in FIG. 10. In the exemplary embodiment of FIG. 10, the first stage of the tunable OADF 250 comprises a second microring 258 series-coupled with the first microring between the optical path 230 and the drop waveguide 257. Thus, in operation, the resonant optical radiation first propagates through the first microring and then to through the second and finally through the drop waveguide 257. Advantageously, additional series-coupled microrings may be added within the first stage, e.g., in order to improve the roll-off of the drop function of the optical filter 250.

Optionally, additional microring-based filtering stages may be cascaded along the optical path 230 in order to improve the optical response of the optical filter 250. For example, each of them may be apt to 'clean' the thru channels (i.e. to further remove the resonant channel from the optical path 230) and/or to add a further channel, preferably equal to the dropped one, into the first optical path 230, in case the first stage acts as a drop stage. In FIG. 10 a second and a third stage are exemplarily shown having a configuration and an operating point (i.e. resonance frequencies) identical to that of the first stage, so as to clean the thru channels.

Figure 11A:
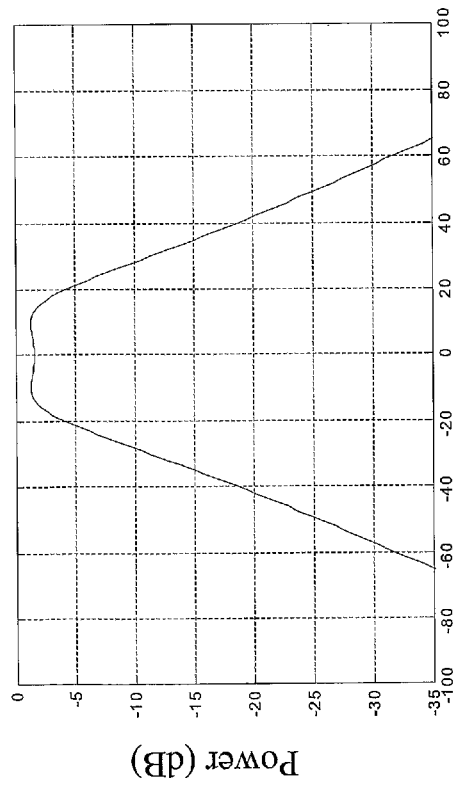
FIGS. 11A and B respectively show the calculated amplitude and dispersion response of the optical add and/or drop filter comprised in the device shown in FIG. 10.
Figure 11B:
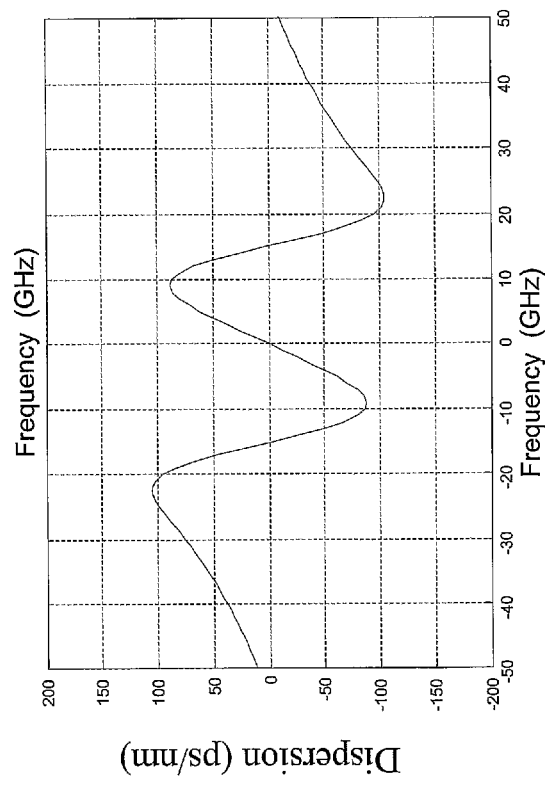

In FIGS. 11a and 11b there are respectively plot the calculated (transfer matrix method) amplitude and dispersion drop response at the drop port 256 of the three stages—two series-coupled microrings add and/or drop filter 250 described above. As in the previous examples (see FIGS. 5, 6 and 8, 9) silicon waveguides buried in a $SiO_2$ cladding were contemplated, but the OADF 250 can be realized by any known optical material system. Within each stage, the power coupling coefficients of the couplers between the bus-waveguides (230 or 257) and the waveguides constituting the microrings are equal to about 7.8% (suitable range 6.5%-8.5%) and the power coupling coefficient of the coupler between the two adjacent microrings is equal to about 0.21% (suitable range 0.19%-0.22%). The microring radius is equal to about 4.9 (±1%) PM, which corresponds to a FSR equal to about 2300 GHz (18.4 nm around 1550 nm), in accordance with the present invention. The exemplarily designed second order Chebyshev optical filter 250 meets the following specifications: passband (at drop port 256) equal to about 35 GHz with drop loss less than about 3 dB, extinction (at drop port 256) on adjacent WDM channels (200 GHz spacing) greater than or equal to about 30 dB. In the exemplary embodiment of FIG. 11, the bus and the microring waveguides were wide respectively about 400 nm and 490 nm and high about 220 nm, the bus to ring gap was about 130 nm wide and the ring to ring gap was about 260 mm wide. All the other design parameters have been assumed equal to the previous examples (FIGS. 5 and 6, 8 and 9).

The OADF 250 may be thermally tuned by micro-heater (not shown) placed above the microrings, e.g. over the $SiO_2$ upper cladding. Other known tuning techniques may be used, such as electro-optics, magneto-optics, opto-mechanical and the like.

In one embodiment, a tunable resonant all-pass filter 454 placed along the bypass path 451 is adapted to be tuned to match the phase distortion introduced by the optical filter 250. The all pass filter 454 may comprise a single microring resonator with FSR substantially equal to the FSR of the tunable OADF 250 and having bus-to-ring power coupling coefficient substantially equal to the coupling coefficient of a single stage of the OADF 250 times the number of stages of the OADF 250 (three in the example above). The resulting power coupling coefficient for the above example is equal to about 23.4%.

Figure 12:
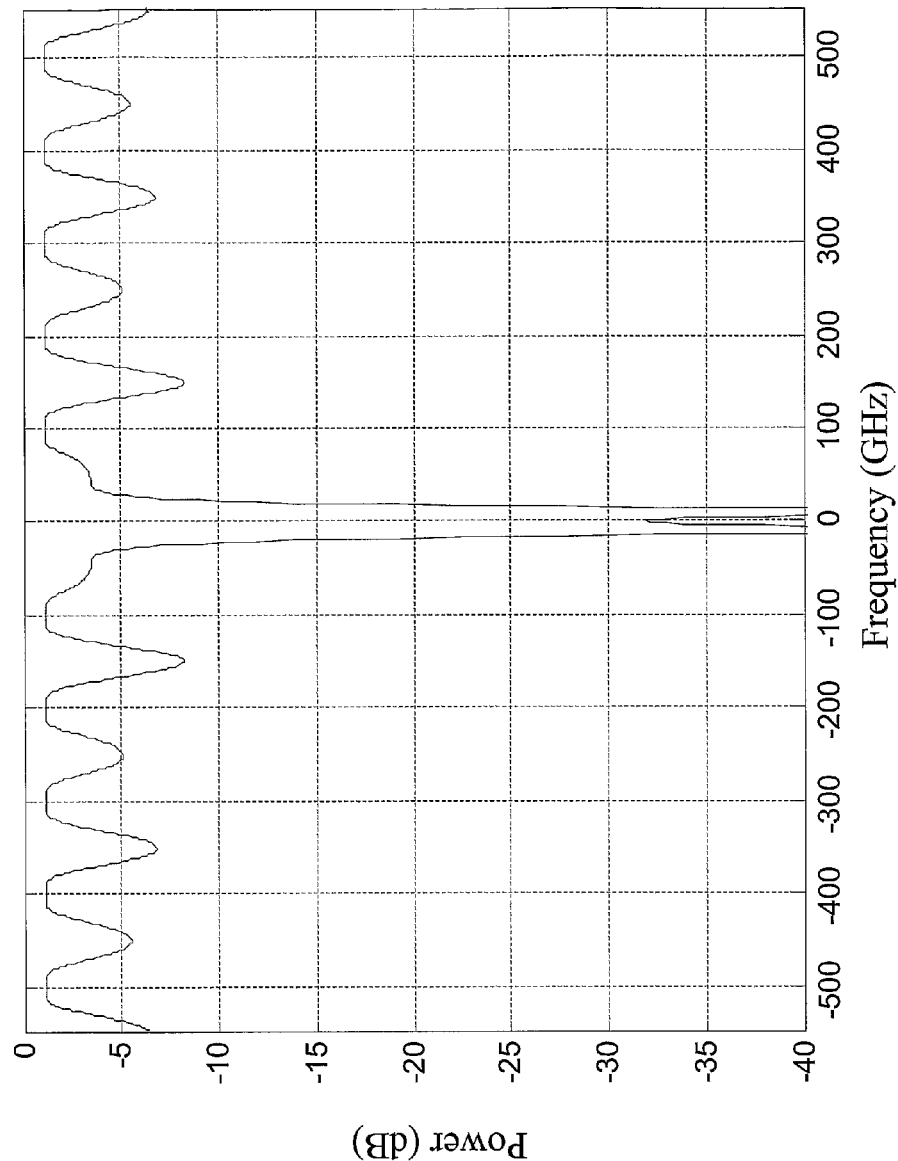
FIGS. 12 and 13 respectively show the calculated amplitude and dispersion response of the optical add and/or drop multiplexing device shown in FIG. 10 and comprising the optical splitter and combiner shown in FIG. 4.

FIG. 12 shows the power response at the output port 226 of the tunable OADM 10 exemplarily described with reference to FIGS. 10 and 11, when the optical splitter and combiner 210, 220 are those described with reference to FIGS. 4, 5 and 6, in the embodiment wherein the combiner 220 has the resonances shifted by half FSR (i.e. one frequency spacing) with respect to the optical splitter 210. The filter specifications are met: the extinction ratio at the drop channel is less than 30 dB and the insertion loss for the thru channels is about 1 dB.

Figure 13:
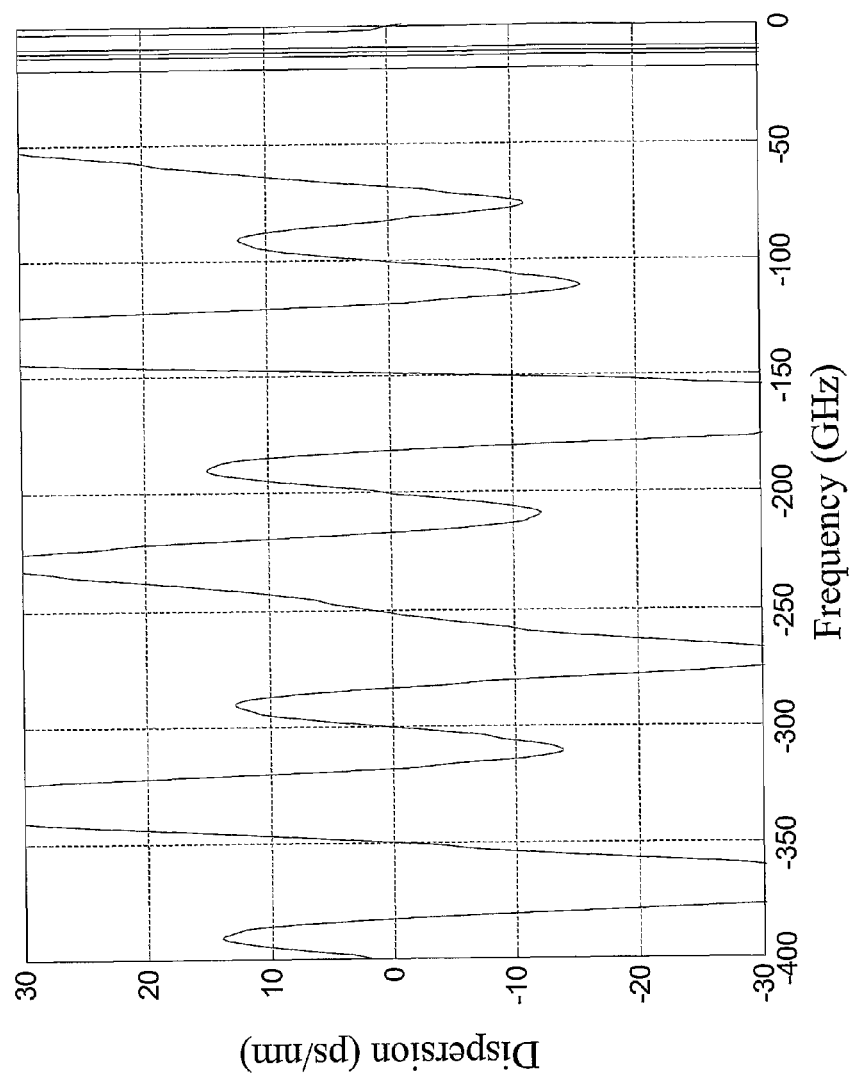

FIG. 13 shows the corresponding dispersion response at the output port 226. The dispersion specification of 20 ps/nm is met in correspondence of the thru channels.

In an embodiment, as shown in FIG. 10, the drop cell 299 may have a single drop port 298. This can be accomplished when the drop waveguide 257 of the OADF 250 and the drop waveguide 267 of the OADF 260 are the same waveguide. In other words, a common drop waveguide (257, 267) is optically coupled both to the drop stage of the OADF 250 and to the drop stage of the OADF 260. The drop port 298 may belong to this common waveguide. In this configuration, one of the two OADF (e.g. 260, as shown in FIG. 10) is placed downstream the other optical filter (e.g., 250) with respect to the direction of propagation of a dropped optical radiation along the common drop waveguide. In other words, OADF 260 is placed downstream the output port 256 of the optical filter 250. In this case, care should be taken that the downstream OADF does not insert in the optical path 240 the channel dropped by the upstream OADF, thus removing the dropped channel from the common drop waveguide. For this reason, it is preferable that the OADF having an FSR exceeding the half of the optical bandwidth by a quantity greater than the frequency spacing is the downstream OADF. In case the upstream OADF is dropping a channel at or near the center of the bandwidth, this solution allows parking the parked resonance of the downstream OADF on a channel having the same parity of the dropped channel but different from the latter. Moreover, a common drop waveguide allows a single drop port in presence of the two OADFs 250, 260 without adding loss to the dropped channel, which for example arises when using a conventional 3-dB coupler.

Optionally, a drop cleaning stage 270 may be coupled to the common drop waveguide (257, 267) to further clean the dropped channel. For example, the role of the drop cleaning stage may be to remove the residual optical power, if any, in correspondence of the "parked" resonance of one of the two OADFs 250, 260.

In an alternative embodiment of the present invention, the optical splitter and combiner 210, 220 of the OADM device 10 of FIG. 10 are two identical devices based on a loaded-MZI as described with reference to FIG. 7.

Figure 14A:
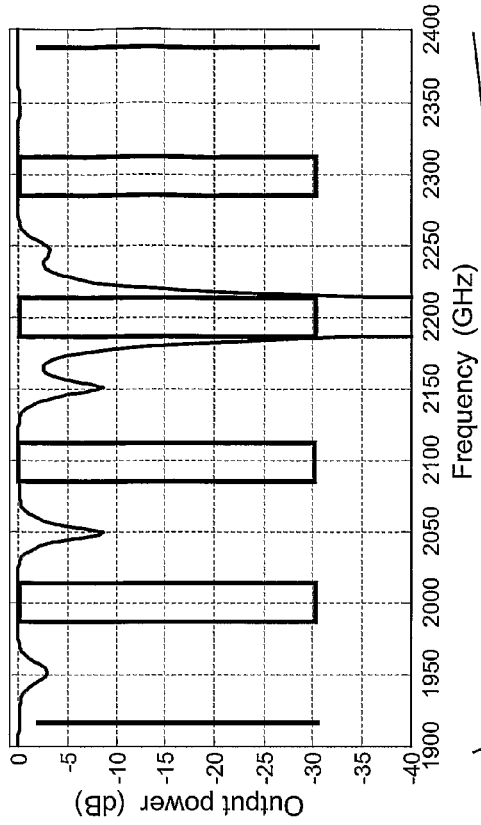
FIGS. 14A and 15A are inset in a band of interest.
Figure 14:
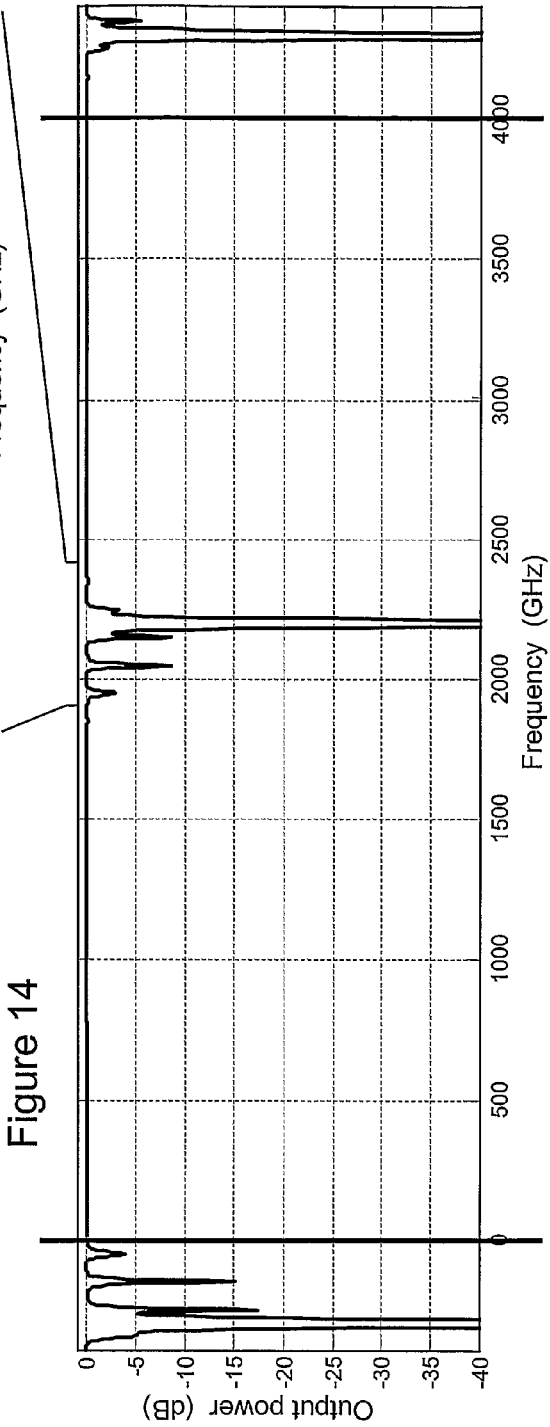
FIGS. 14 and 15 respectively show the calculated amplitude and dispersion response at the thru port of the optical add and/or drop multiplexing device shown in FIG. 10 and comprising the optical splitter and combiner shown in FIG. 7.

FIG. 14 shows the power response at the output port 228 of the OADM device 10 of FIG. 10 when the optical splitter and combiner 210, 220 are as described with reference to FIGS. 8 and 9. FIG. 14A is an inset in a band of interest.

Figure 15A:
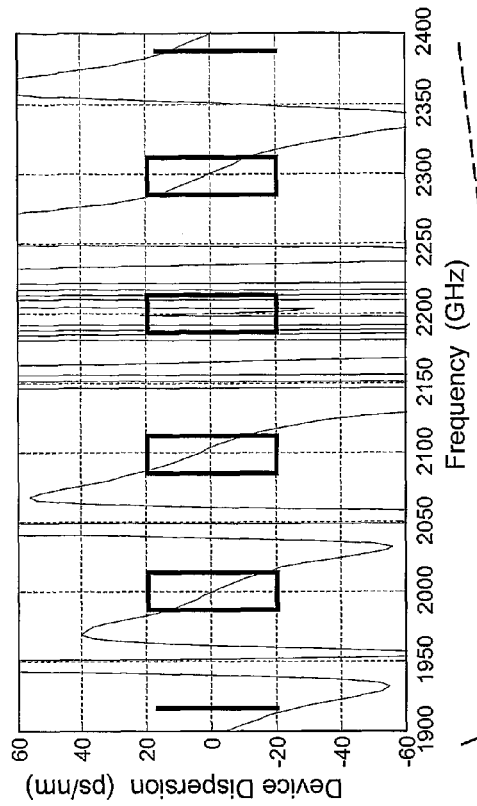
Figure 15:
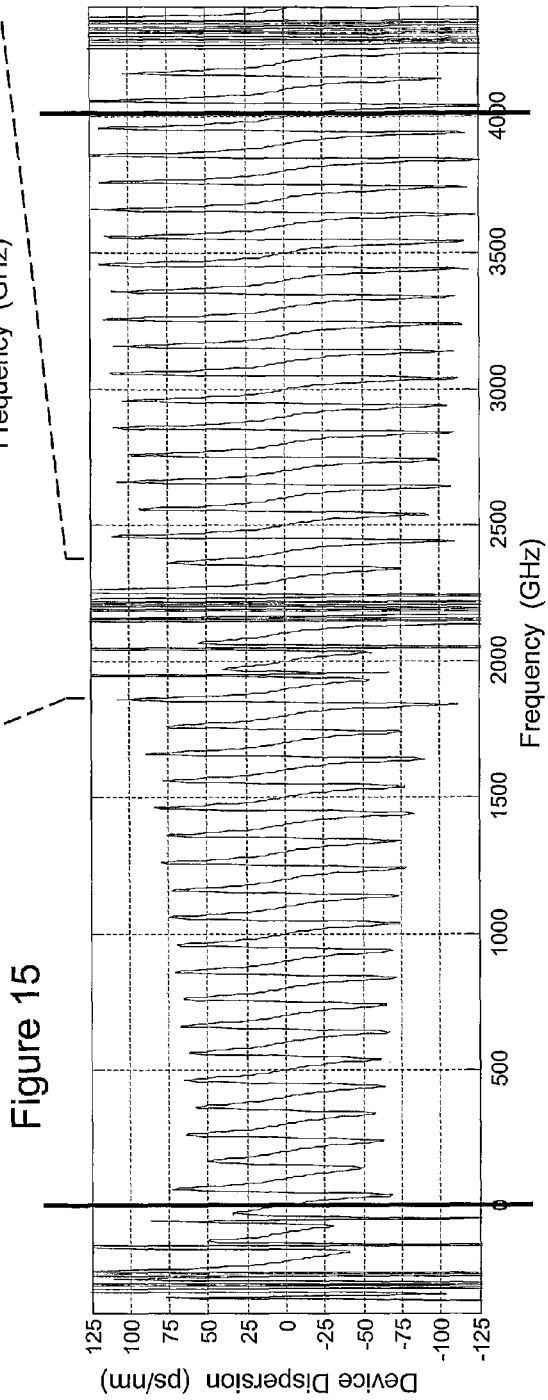

FIG. 15 shows the corresponding dispersion response. FIG. 15A is an inset in a band of interest. The dispersion curve in FIGS. 15 and 15A shows that at the output port 228 the dispersion specification of 20 ps/nm is met.

Figure 16A:
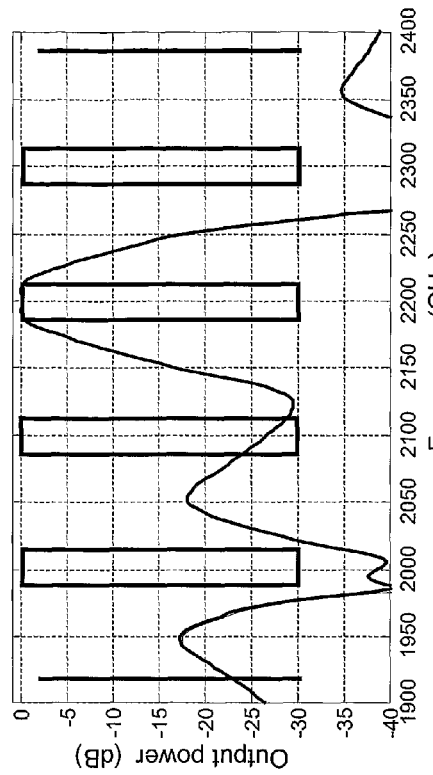
FIG. 16A is an inset in a band of interest.
Figure 16:
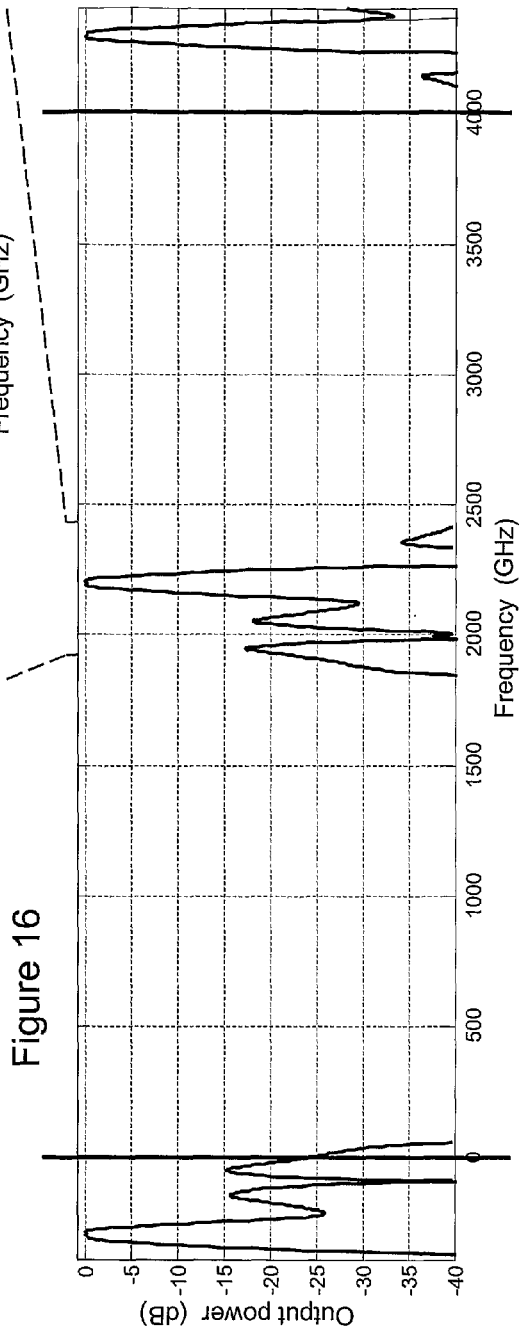
FIG. 16 shows the drop power response of the same device of FIGS. 14 and 15.

FIG. 16 shows the corresponding power response at the drop port 256 (or 266, depending on the operative conditions).

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. An optical device comprising:
    an optical splitter having an input port, a first output port and a second output port and adapted to receive at said input port, an optical signal comprising a plurality of channels lying on a grid of optical frequencies equally spaced by a frequency spacing and occupying an optical bandwidth, and wherein said optical splitter is adapted to output at said first and second output ports, respectively, a first and a second portion of said optical signal;
    an optical combiner having a respective first and second input ports and a respective output port and adapted to combine two optical radiations, input respectively into the first and second input ports, and to output them into the respective output port;
    a first optical path optically connecting the first output port of the optical splitter to the first input port of the optical combiner and capable of propagating said first portion;
    a second optical path optically connecting the second output port of the optical splitter to the second input port of the optical combiner and capable of propagating said second portion;
    a first optical filter optically coupled along the first optical path and capable of filtering a channel within said first portion propagating through the first optical path;
    a first bypass path bypassing the first optical filter; and
    a first optical switch optically coupled to the first optical path and the first bypass path, the optical switch continuously switching the first optical path between the first optical filter and the first bypass path;
    wherein the optical device further comprises a second optical filter optically coupled to the second optical path and capable of filtering a channel within said second portion propagating through the second optical path; and
    wherein said first portion substantially comprises the channels which lie on a sub-grid of optical frequencies equally spaced by the double of said frequency spacing and the second portion substantially comprises the remaining channels, and the free spectral range of both the first and the second optical filters is substantially equal to an odd multiple of said frequency spacing and greater than half of said optical bandwidth.

2. The optical device of claim 1, wherein the free spectral range of at least one of the first and second optical filters exceeds half of said optical bandwidth by more than said frequency spacing.

3. The optical device of claim 1, wherein the optical combiner has the same structure of the optical splitter.

4. The optical device of claim 1, wherein the optical splitter comprises one or more resonant cavities.

5. The optical device of claim 4, wherein the optical splitter comprises a Mach-Zehnder interferometer having an all-pass filter optically coupled to an arm of said Mach-Zehnder interferometer and wherein the free spectral range of the all-pass filter is equal to said frequency spacing.

6. The optical device of claim 4, wherein said one or more resonant cavities are optically coupled to, and interposed between, two optical waveguides.

7. The optical device of claim 6, wherein the optical combiner has the same structure of the optical splitter and wherein the optical splitter and the optical combiner are configured so that the optical frequencies of the second portion are resonant with the resonances of the optical splitter and the optical frequencies of the first portion are resonant with the resonances of the optical combiner.

8. The optical device of claim 1, wherein each of the first and second optical filters is an add and/or drop filter comprising a respective optical port adapted to drop or add an optical channel respectively within the first and the second portion.

9. The optical device of claim 8, wherein the first optical filter comprises at least a resonator optically coupled to, and interposed between, the first optical path and a drop waveguide so as to be capable of dropping an optical channel within the first portion from the first optical path toward said drop waveguide.

10. The optical device of claim 9, wherein the second optical filter comprises at least a respective resonator optically coupled to, and interposed between, the second optical path and a respective drop waveguide so as to be capable of dropping an optical channel within the second portion from the second optical path toward said respective drop waveguide.

11. The optical device of claim 10, wherein the drop waveguide of the first optical filter and the drop waveguide of the second optical filter are the same waveguide so that the first optical filter and the second optical filter share the same drop waveguide.

12. The optical device of claim 1, wherein the second optical filter has the same structure of the first optical filter.

13. The optical device of claim 1, wherein said optical bandwidth is greater than or equal to about 1 THz.

14. The optical device of claim 1, wherein the first and/or the second optical filters comprise micro-ring or racetrack resonators.

15. An optical communication system comprising a transmitter, a receiver, an optical line optically connecting the transmitter and the receiver, and an optical device according to claim 1, wherein the optical device is coupled along the optical line.

16. A method for filtering an optical signal comprising a plurality of channels lying on a grid of optical frequencies equally spaced by a given frequency spacing and occupying an optical bandwidth, comprising:

splitting said optical signal into a first and a second portion spatially separated, wherein the first portion substantially comprises the channels lying on a first sub-grid of optical frequencies spaced by double of said frequency spacing and the second portion substantially comprises the remaining channels lying on a second sub-grid, filtering a channel belonging to the first portion by way of a first optical filter adapted to act solely on the first portion and configured so that one of its resonances overlaps the optical frequency of said channel, one of the two adjacent resonances overlapping an optical frequency of the second sub-grid and the other adjacent resonance lies outside said optical bandwidth;

making the second portion bypass a second optical filter adapted to act solely on the second portion;

configuring said second optical filter so that one of its resonances overlaps an optical frequency of the first sub-grid near the center of said optical bandwidth and the two respective adjacent resonances both lie outside said optical bandwidth; and recombining said first and second filtered portions.

17. The method of claim 16, wherein a distance between said one resonance of said second optical filter and each one of said two adjacent resonances exceeds half of the optical bandwidth by more than said frequency spacing.

18. The method of claim 16, wherein a distance between said one resonance of said first optical filter and each one of said two adjacent resonances exceeds half of the optical bandwidth.

19. The method of claim 16, wherein said one resonance of said second optical filter overlapping said optical frequency of the first sub-grid near the center of said optical bandwidth is distinct from the optical frequency of the filtered channel.

20. The method of claim 16, wherein each of the first and second optical filters is an add and/or drop filter adapted to drop or add an optical channel respectively within the first and the second portion.

21. A method for changing the filtering of an optical signal comprising a plurality of channels lying on a grid of optical frequencies equally spaced by a given frequency spacing and occupying an optical bandwidth, comprising:

a) configuring an optical splitter so as to split said optical signal into a first and a second portion directed respectively to a first and a second optical path, wherein the first portion substantially comprises the channels lying on a first sub-grid of optical frequencies spaced by double of said frequency spacing and the second portion substantially comprises the remaining channels lying on a second sub-grid;

b) filtering an initial channel belonging to the first portion by way of a first optical filter optically coupled along the first optical path and configured so that one of its resonances overlaps the optical frequency of said initial channel, one of the two adjacent resonances overlapping an optical frequency of the second sub-grid and the other adjacent resonance lying outside said optical bandwidth;

c) configuring an optical combiner so as to recombine said first and second filtered portions;

d) making the first portion to bypass said first optical filter; and e) tuning said first optical filter so that one of its resonances overlaps an optical frequency of the second sub-grid near the center of said optical bandwidth and the two respective adjacent resonances both lie outside said optical bandwidth;

f) tuning a second optical filter optically coupled along the second optical path so that one of its resonances overlaps the optical frequency of a final channel belonging to the second portion, a respective adjacent resonance overlaps an optical frequency of the first sub-grid and the other adjacent resonance lies outside said optical bandwidth; and g) filtering said final channel by way of the second optical filter.

22. The method of claim 21, further comprising, before steps d), e) f), and g):

h) making the second portion bypass said second optical filter; and i) tuning said second optical filter so that one of its resonances overlaps an optical frequency of the first sub-grid near the center of said optical bandwidth and the two respective adjacent resonances both lie outside said optical bandwidth.

23. A method for changing the filtering of an optical signal comprising a plurality of channels lying on a grid of optical frequencies equally spaced by a given frequency spacing and occupying an optical bandwidth, comprising:

a) tuning an optical splitter so as to split said optical signal into a first and a second portion directed respectively to a first and a second optical path, wherein the first portion substantially comprises the channels lying on a first sub-grid of optical frequencies spaced by double of said frequency spacing and the second portion substantially comprises the remaining channels lying on a second sub-grid;

b) filtering an initial channel belonging to the first portion by way of a first optical filter optically coupled along the first optical path and configured so that one of its resonances overlaps the optical frequency of said initial channel, one of the two adjacent resonances overlapping an optical frequency of the second sub-grid and the other adjacent resonance lying outside said optical bandwidth;

c) tuning an optical combiner so as to recombine said filtered first and second portions, d) tuning said optical splitter so that it splits said optical signal into said first and second portions directed respectively to said second and first optical path;

e) making the second portion to bypass said second optical filter;

f) tuning said first optical filter so that one of its resonances overlaps an optical frequency of the first sub-grid near the center of said optical bandwidth and the two respective adjacent resonances both lie outside said optical bandwidth;

g) tuning a second optical filter optically coupled along the second optical path so that one of its resonances overlaps the optical frequency of a final channel belonging to the first portion, a respective adjacent resonance overlapping an optical frequency of the second sub-grid and the other adjacent resonance lying outside said optical bandwidth;

h) filtering said final channel by way of the second optical filter; and
i) tuning said optical combiner so that it recombines said filtered first and second portions.

24. The method of claim 23, further comprising, before steps d), e), f), g), h) and i):
j) making the second portion bypass said second optical filter; and
k) tuning said second optical filter so that one of its resonances overlaps an optical frequency of the first sub-grid near the center of said optical bandwidth and the two respective adjacent resonances both lie outside said optical bandwidth.

* * * * *